(12) United States Patent
Biswas et al.

(10) Patent No.: US 10,936,785 B2
(45) Date of Patent: Mar. 2, 2021

(54) INTER-CELL LEAKAGE-REDUCING METHOD OF GENERATING LAYOUT DIAGRAM AND SYSTEM FOR SAME

(71) Applicant: TAIWAN SEMICONDUCTOR MANUFACTURING COMPANY LTD., Hsinchu (TW)

(72) Inventors: Hiranmay Biswas, Kolkata (IN); Chung-Hsing Wang, Baoshan Township (TW); Kuo-Nan Yang, Hsinchu (TW); Jia Han Lin, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/547,065

(22) Filed: Aug. 21, 2019

(65) Prior Publication Data

US 2020/0074042 A1 Mar. 5, 2020

Related U.S. Application Data

(60) Provisional application No. 62/725,570, filed on Aug. 31, 2018.

(51) Int. Cl.
| | |
|---|---|
| *G06F 30/398* | (2020.01) |
| *G06F 119/18* | (2020.01) |
| *G03F 7/20* | (2006.01) |
| *H01L 27/092* | (2006.01) |
| *H01L 27/02* | (2006.01) |
| *G06F 30/392* | (2020.01) |

(52) U.S. Cl.
CPC ........ *G06F 30/398* (2020.01); *G03F 7/70433* (2013.01); *G06F 30/392* (2020.01); *G06F 2119/18* (2020.01); *H01L 27/0207* (2013.01); *H01L 27/0922* (2013.01)

(58) Field of Classification Search
CPC .............. G06F 30/398; G06F 2119/06; G06F 2119/10; G06F 30/367; G06F 2119/18; G06F 30/392; G06F 119/18; G03F 7/70433; G03F 7/20; H01L 27/0207; H01L 27/092; H01L 27/0922; H02L 27/02
See application file for complete search history.

(56) References Cited

U.S. PATENT DOCUMENTS

| | | |
|---|---|---|
| 7,260,442 B2 | 8/2007 | Hwang et al. |
| 9,256,709 B2 | 2/2016 | Yu et al. |

(Continued)

*Primary Examiner* — Vuthe Siek
(74) *Attorney, Agent, or Firm* — Hauptman Ham, LLP

(57) ABSTRACT

A method (of manufacturing a semiconductor device) includes, for a layout diagram stored on a non-transitory computer-readable medium, generating the layout diagram including: populating a row which extends in a first direction with a group of cells, each cell representing a circuit, and first and second side boundaries of each cell being substantially parallel and extending in a second direction which is substantially perpendicular to the first direction; locating, relative to the first direction, cells so that neighboring ones of the cells are substantially abutting; and reducing an aggregate leakage tendency of the group by performing at least one of the following, (A) changing an orientation of at least one of the cells, or (B) changing locations correspondingly of at least two of the cells.

20 Claims, 26 Drawing Sheets

(56) References Cited

U.S. PATENT DOCUMENTS

2014/0040838 A1 2/2014 Liu et al.
2015/0067624 A1* 3/2015 Tam ..................... G06F 30/367
  716/111
2015/0278429 A1 10/2015 Chang

* cited by examiner

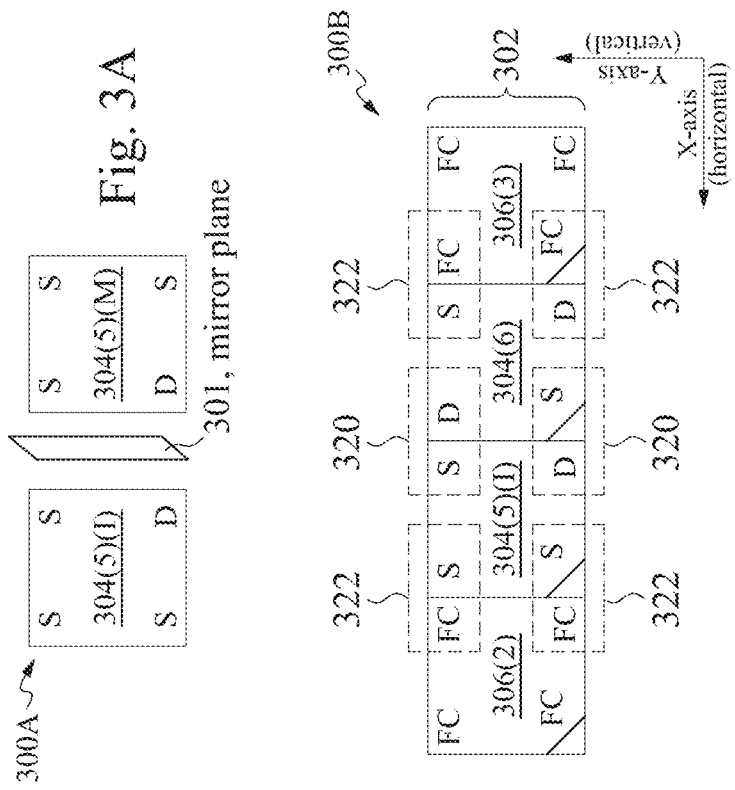

300P (perspective of lesser VT)

| Row | Item# | Edge Combo | #QEPs | VT Type | Leakage |
|---|---|---|---|---|---|
| 1 | 320 | S/D\|D | 4 | ULVT | 4*8x*400y |
| 2 | 322 | S/D\|FC | 0 | ULVT | 0 |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 4 | SVT | 0 |
| 8 | 322 | S/D\|FC | 4 | SVT | 4*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 12816xy |

Fig. 3P 300O (perspective of greater VT)

| Row | Item# | Edge Combo | #QEPs | VT Type | Leakage |
|---|---|---|---|---|---|
| 1 | 320 | S/D\|D | 0 | ULVT | 0 |
| 2 | 322 | S/D\|FC | 0 | ULVT | 0 |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 4 | SVT | 4*8x*4y |
| 8 | 322 | S/D\|FC | 4 | SVT | 4*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 144xy |

Fig. 3O 300S (perspective of lesser VT)

| Row | Item# | Edge Combo | #QEPs | VT Type | Leakage |
|---|---|---|---|---|---|
| 1 | 320 | S/D\|D | 2 | ULVT | 2*8x*400y |
| 2 | 322 | S/D\|FC | 2 | ULVT | 2*1x*400y |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 2 | SVT | 2*8x*4y |
| 8 | 322 | S/D\|FC | 2 | SVT | 2*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Post (TP) | 8 | | 8072xy TP≈0.63*TA |

Fig. 3S 300R (perspective of greater VT)

| Row | Item# | Edge Combo | #QEPs | VT Type | Leakage |
|---|---|---|---|---|---|
| 1 | 320 | S/D\|D | 0 | ULVT | 0 |
| 2 | 322 | S/D\|FC | 0 | ULVT | 0 |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 4 | SVT | 4*8x*4y |
| 8 | 322 | S/D\|FC | 4 | SVT | 4*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Post (TP) | 8 | | 144xy TP=TA |

Fig. 3R 300V (perspective of lesser VT)

| Row Item# | | Edge Combo | #QEPs | VT Type | Leakage |
|---|---|---|---|---|---|
| 1 | 320 | S/D\|D | 3 | ULVT | 3*8x**400y |
| 2 | 322 | S/D\|FC | 2 | ULVT | 2*1x**400y |
| 3 | 324 | S/D\|FB | 1 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 0 | SVT | 0 |
| 8 | 322 | S/D\|FC | 2 | SVT | 2*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 8072xy<br>TP=0.63*TA |

Fig. 3V 300U (perspective of greater VT)

| Row Item# | | Edge Combo | #QEPs | VT Type | Leakage |
|---|---|---|---|---|---|
| 1 | 320 | S/D\|D | 2 | ULVT | 2*8x**400y |
| 2 | 322 | S/D\|FC | 2 | ULVT | 2*1x**400y |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 1 | SVT | 1*8x*4y |
| 8 | 322 | S/D\|FC | 2 | SVT | 2*1x*4y |
| 9 | 324 | S/D\|FB | 1 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 7240xy |

Fig. 3U 300Y (perspective of lesser VT)

| Row | Item# | Edge Combo | #QEPs | VT Type | Leakage |
|---|---|---|---|---|---|
| 1 | 320 | S/D\|D | 3 | ULVT | 3*8x*400y |
| 2 | 322 | S/D\|FC | 2 | ULVT | 2*1x*400y |
| 3 | 324 | S/D\|FB | 1 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 0 | SVT | 0 |
| 8 | 322 | S/D\|FC | 2 | SVT | 2*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 10408xy TP=TA |

Fig. 3Y 300X (perspective of greater VT)

| Row | Item# | Edge Combo | #QEPs | VT Type | Leakage |
|---|---|---|---|---|---|
| 1 | 320 | S/D\|D | 1 | ULVT | 1*8x*400y |
| 2 | 322 | S/D\|FC | 2 | ULVT | 2*1x*400y |
| 3 | 324 | S/D\|FB | 0 | ULVT | 0 |
| 4 | 328 | S\|S | 0 | ULVT | 0 |
| 5 | 324 | FC\|FC | 0 | ULVT | 0 |
| 6 | 330 | FC\|FB | 0 | ULVT | 0 |
| 7 | 320 | S/D\|D | 2 | SVT | 2*8x*4y |
| 8 | 322 | S/D\|FC | 2 | SVT | 2*1x*4y |
| 9 | 324 | S/D\|FB | 0 | SVT | 0 |
| 10 | 328 | S\|S | 0 | SVT | 0 |
| 11 | 324 | FC\|FC | 0 | SVT | 0 |
| 12 | 330 | FC\|FB | 0 | SVT | 0 |
| 13 | | Total_Ante (TA) | 8 | | 4072xy TP=0.56*TA |

INTER-CELL LEAKAGE-REDUCING METHOD OF GENERATING LAYOUT DIAGRAM AND SYSTEM FOR SAME

PRIORITY CLAIM AND CROSS-REFERENCE

This application claims priority to U.S. Provisional Patent Application Ser. No. 62/725,570 filed Aug. 31, 2018, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process technology node by which will be fabricated a semiconductor device based on a layout diagram. The design rule set compensates for variability of the corresponding process technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A, 3B, 3D, 3F, 3H, 3J, 3L, 3N, 3Q, 3T and 3W are corresponding layout diagrams, in accordance with some embodiments.

FIGS. 3C, 3E, 3G, 3I, 3K, 3M, 3O, 3P, 3R, 3S, 3U, 3V, 3X and 3Y are corresponding tables, in accordance with some embodiments.

DETAILED DESCRIPTION

Figure 1:
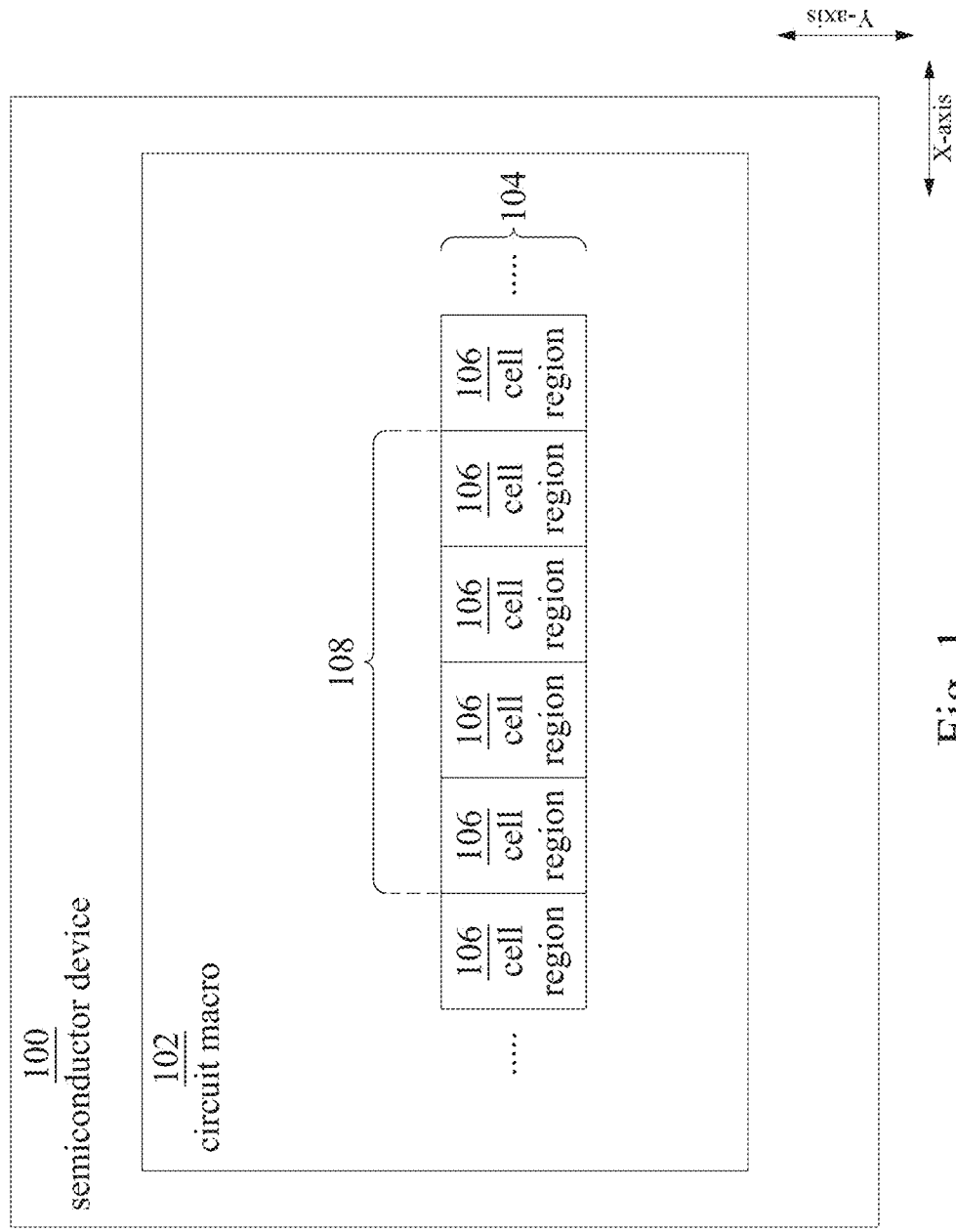
FIG. 1 is a block diagram, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate relationships between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For some embodiments, a method of generating a layout diagram produces a layout diagram for which a semiconductor device based thereon includes an arrangement of cell regions which has benefits including reduced inter-cell-region current leakages. For some embodiments, a method of generating a layout diagram includes: populating a row with a group of cells, each cell representing a circuit; locating, relative to the first direction, cells so that neighboring ones of the cells are substantially abutting; and reducing an aggregate leakage tendency of the group by performing at least one of the following, namely (A) changing an orientation of at least one of the cells or (B) changing locations correspondingly of at least two of the cells. In some embodiments, the orientation of a given cell is changed by replacing the given cell with a substitute cell which is a mirror-symmetric version of the given cell.

FIG. 1 is a block diagram of a semiconductor device 100 in accordance with some embodiments. In FIG. 1, semiconductor device 101 includes, among other things, a circuit macro (hereinafter, macro) 102. In some embodiments, macro 102 is an SRAM macro. In some embodiments, macro 102 is a macro other than an SRAM macro. Macro 102 includes, among other things, a row 104 including cell regions 106. At least a group of cells 106 has an arrangement 104 which reduces inter-cell leakage. Examples of layout diagrams which are used to fabricate arrangement 108 of cell regions 106 include the layout diagrams disclosed herein.

Figure 2A:
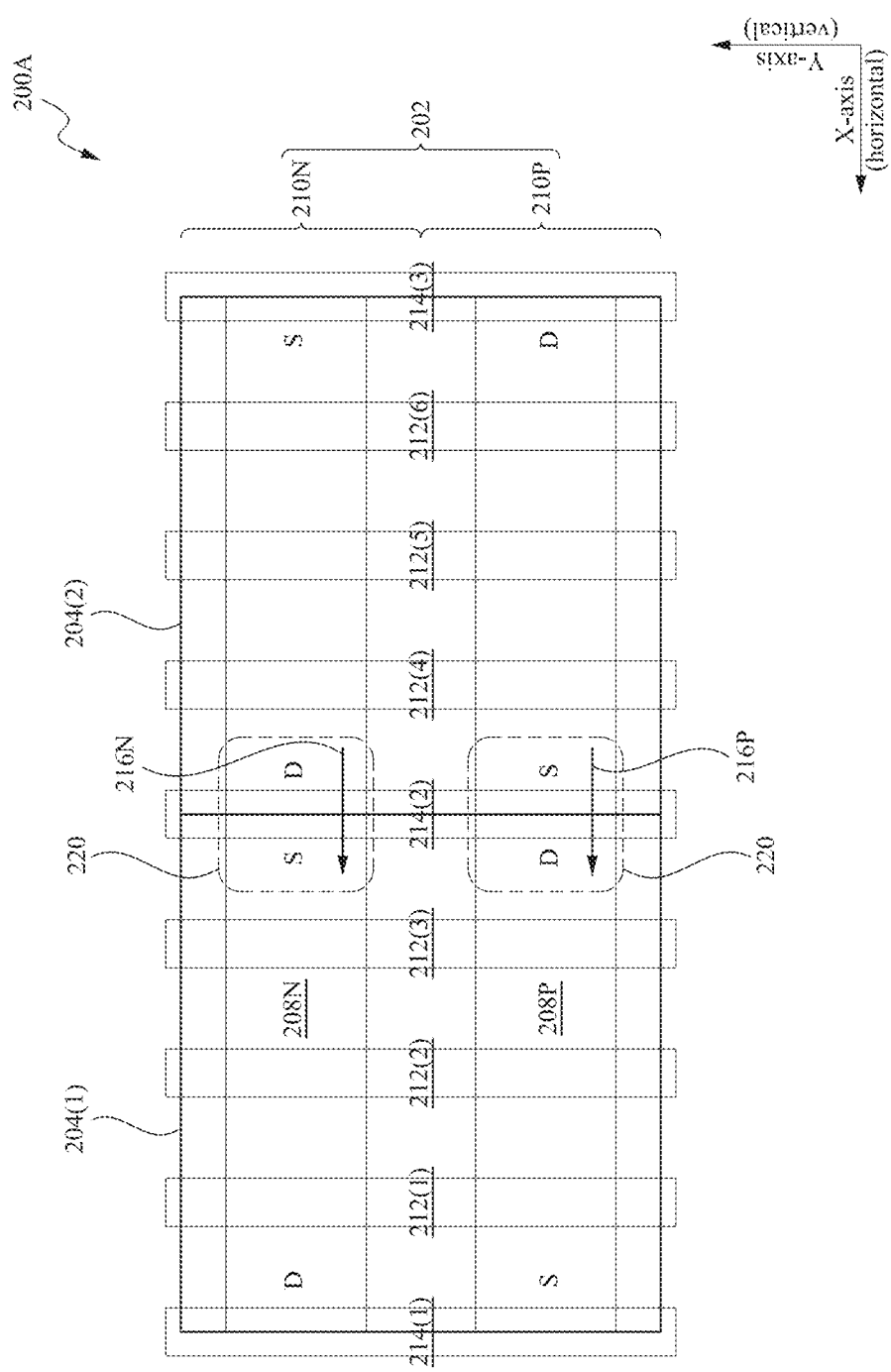
FIGS. 2A-2B are corresponding layout diagrams 200A-200B, in accordance with some embodiments.
Figure 2B:
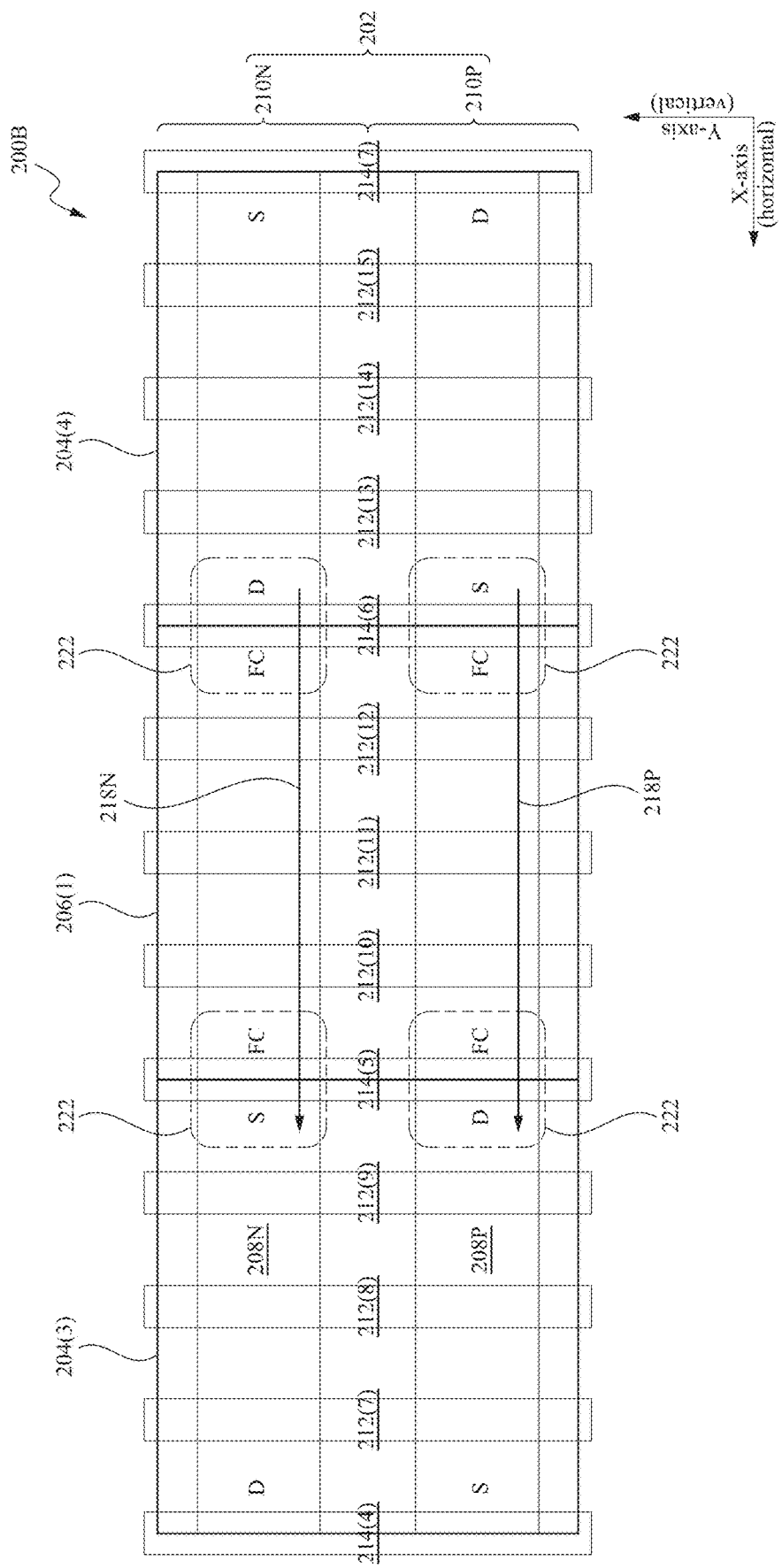

FIGS. 2A-2B are corresponding layout diagrams 200A-200B, in accordance with some embodiments.

FIGS. 2A-2B assume an orthogonal XYZ coordinate system in which the X-axis, Y-axis and Z-axis represent corresponding first, second and third directions. In some embodiments, the first, second and third directions correspond to a different orthogonal coordinate system than the XYZ coordinate system.

In FIG. 2A, layout diagram 200A includes cells 204(1) and 204(2). Cells 204(1) and 204(2) are disposed in row 202, which extends substantially in the first direction (extends horizontally). Cell 204(1) at least substantially abuts cell 204(1). Though not shown for simplicity of illustration, in some embodiments, row 202 includes additional instances of cells such as cells 204(1) and 204(2), e.g., including a first additional cell abutting cell 204(1) and/or a second additional cell abutting cell 204(2), or the like.

Layout diagram 200A further includes: active area patterns 208N and 208P; and gate patterns 212(1), 212(2), 212(3), 212(4), 212(5), 212(6), 214(1), 214(2) and 214(3). Cells 204(1) and 204(2) include corresponding portions of active area patterns 208N and 208P. Gate patterns 212(1), 212(2) and 212(3) are included in cell 204(1). Relative to the X-axis, portions of gate patterns 214(1) and 214(2) which overlap cell 204(1) are included in cell 204(1). Gate patterns 212(4), 212(5) and 212(6) are included in cell 204(2). Relative to the X-axis, portions of gate patterns 214(2) and 214(3) which overlap cell 204(2) are included in cell 204(2).

Active area patterns 208N-208P and gate patterns 212(1)-212(6) and 214(1)-214(3) are included in a transistor level of layout diagram 200A, where the transistor level represents a transistor layer in a semiconductor device based on layout diagram 200A. Active area patterns 208N and 208P have corresponding long axes extending substantially along the X-axis (extending horizontally). Gate patterns 212(1), 212(2), 212(3), 212(4), 212(5), 212(6), 214(1), 214(2) and 214(3) are disposed over corresponding active area patterns 208N and 208P, and have corresponding long axes extending substantially along the Y-axis (extending vertically).

In some embodiments, active area patterns 208N and 208P are designated correspondingly for NMOS and PMOS configuration so that a semiconductor device based on layout diagram 200A includes cell regions corresponding to cells 204(1) and 204(2), each of the cell regions having an NMOS-configured active region (not shown) and a PMOS-configured active region (not shown) corresponding to active area patterns 208N and 208P. In layout diagram 200A, active area patterns 208N and 208P correspond to sub-rows 210N and 210P. In some embodiments, active area patterns 208N and 208P are designated for finFET configuration. In some embodiments, active area patterns 208N and 208P are designated for planar transistor configuration.

Relative to the X-axis gate patterns 214(1), 212(1), 212(2), 212(3), 214(2), 212(4), 212(5), 212(6) and 214(3) are separated by a uniform distance. In some embodiments, the uniform distance represents one CPP, e.g., gate patterns 214(1) and 212(1) are separated by one CPP. Accordingly, relative to the X-axis, cell 204(1) has a width of 4 CPP.

Cells 204(1) and 204(2) represent circuits. In some embodiments, cells 204(1)-204(2) represent corresponding circuits which provide corresponding functions. In some embodiments, cells 204(1)-204(2) represent corresponding circuits which provide corresponding logical functions, and are referred to accordingly as logic cells. In some embodiments, at least one of cells 204(1)-204(2) represents a circuit which provides a function other than a logical function In some embodiments, each of cells 204(1)-204(2) has a corresponding input (see FIGS. 4A-4B) and a corresponding output (see FIGS. 4A-4B). In some embodiments, first and second ones of gate patterns 212(1), 212(2) and 212(3) correspondingly are designated to receive the input and provide the output of cell 204(1). In some embodiments, first and second ones of gate patterns 212(4), 212(5) and 212(6) correspondingly are designated to receive the input and provide the output of cell 204(2). Depending on corresponding logical functions of cells 204(1) and 204(2), one or more cut patterns (not shown) are placed over corresponding gate patterns 212(1)-212(6), where a given cut pattern over a corresponding given one of gate patterns 212(1)-212(6) represents a gate line in a semiconductor device which has been cut into: a discrete upper portion of the gate line disposed over the active region corresponding to active area pattern 208N; and a discrete lower portion of the gate line disposed over the active region corresponding to active area pattern 208P.

In some embodiments, active area patterns 208N and 208P are designated for corresponding NMOS and PMOS configurations and represent corresponding NMOS-configured and PMOS-configured active regions of cell regions in a semiconductor device based on layout diagram 200A. In some embodiments, in a circumstance in which an active region extends substantially continuously across a border between abutting active regions in a semiconductor device, the portion of the active region at the border is referred to as a continuous active (CNA) region. In some embodiments in which an active region is referred to as an oxide-dimensioned (OD) region, a CNA region is referred to as a continuous OD region (CNOD) region. In some embodiments, active area patterns 208N and 208P are substantially continuous across a border between cells 204(1) and 204(2), which represent correspondingly N-type and P-type CNA regions in a semiconductor device based on layout diagram 200A.

Each of cells 204(1) and 204(2) is organized into quadrants having corresponding quadrant-edges. Different quadrant-edge configurations (QECs) result in correspondingly different types of quadrant-edge pairs (QEPs), one type of which is QEP 220 in FIG. 2A. In some embodiments in which each QEP represents a transistor in the corresponding semiconductor device, a portion of corresponding sub-row 210N or 210P at the corresponding quadrant-edge of corresponding cell 204(1) or 204(2) represents a drain region or a source region of the transistor. Relative to the X-axis, there are three varieties of QEP 220: a first variety in which a source region (S) is abuttingly disposed to the left of a drain region (D), for which shorthand notation is S|D; a second variety in which a drain region (D) is abuttingly disposed to the left of a source region (S), for which a shorthand notation is D|S; and a third variety in which a drain region (D) is abuttingly disposed to the left of a drain region (D), for which a shorthand notation is D|D.

In the example of FIG. 2A, QEP 220 of sub-row 210N is the first variety (S|D) of QEP 220, and QEP 220 of sub-row 210P is the second variety (D|S) of QEP. The third variety (D|D) of QEP 220 is not shown in FIG. 2A (see FIGS. 3H, 3N, 3Q, 3T, 3W, or the like). In some embodiments, combinations of the varieties of QEP 220 for layout diagram 200A are different than the combination of the varieties of QEP 220 for layout diagram 200A shown in FIG. 2A.

Gate pattern 214(2) substantially aligns with abutting edges of cells 204(1) and 204(2). In some embodiments: an upper segment of gate pattern 214(2) above a cut pattern (not shown) is designated for a first reference voltages which turns off a transistor corresponding to QEP 22 of sub-row 210N in a semiconductor device based on layout diagram 200A; and a lower segment of gate pattern 214(2) below a cut pattern (not shown) is designated for a second reference voltages which turns off a transistor corresponding to QEP 22 of sub-row 210P in a semiconductor device based on layout diagram 200A. In some embodiments, the first and second reference voltages correspondingly are VSS and VDD. In some embodiments, the first and second reference voltages correspondingly are voltages other than correspondingly VSS and VDD. In some embodiments, gate pattern 214(2) is referred to as a dummy gate pattern. Similarly, gate patterns 214(1) and 214(3) are referred to as dummy gate patterns. By contrast, gate patterns 212(1)-212 (6) are not dummy gate patterns. In some embodiments, gate patterns 212(1)-212(6) are referred to as active gate patterns. In some embodiments, gate patterns 212(1)-212(6) are referred to as active gate patterns because one or more gate patterns 212(1)-212(6) are designated for signals involved in providing the functions of corresponding cell regions in a semiconductor device based on layout diagram 200A, where the cell regions are represented by corresponding cells 204(1) and 204(2).

Despite upper and lower segments of dummy gate pattern 214(2) being designated for voltages which represent turn-off voltages of transistors in a semiconductor device based on layout diagram 200A, the transistors shaving locations corresponding to QEP 22 of sub-row 210N and QEP 22 of sub-row 210P, nevertheless the transistors permit some corresponding leakage currents to flow. The leakages currents are represented in FIG. 2A by arrows 216N and 216P in corresponding sub-rows 210N and 210P. Leakage currents 216N and 216P are discussed in more detail below (see Table 1).

In addition to the active area patterns and gate patterns discussed above, in some embodiments (though not shown in order to simplify illustration), the transistor level of layout diagram 200A further includes metal-over-drain/source (MD) patterns, metal-over-gate (MG or MP) patterns, via-to drain/source (VD) contact patterns and/or via-to-gate (VG) contact patterns in the transistor level. Particular arrangements of such patterns depend at least in part on the functions which corresponding cells 204(1) and 204(2) represent, and at least in part on the semiconductor process technology node corresponding to layout diagram 200A.

Also in addition to the active area patterns and gate patterns discussed above, in some embodiments (though not shown in order to simplify illustration), layout diagram 200A includes overlying alternating metallization levels and via levels, with the metallization layers including corresponding conductive patterns and the via levels including corresponding via patterns. Particular arrangements of such patterns depend at least in part on the functions which corresponding cells 204(1) and 204(2) represent, and at least in part on the semiconductor process technology node corresponding to layout diagram 200A.

Layout diagram 200B is similar to layout diagram 200A. FIG. 2B follows a similar numbering convention to that of FIG. 2A. Though corresponding, some components also differ. To help identify components which correspond but nevertheless have differences, the numbering convention uses parenthetical numbers. For example, cell 204(3) in FIG. 2B and cell 204(1) in FIG. 2A are both logic cells, similarities being reflected in the common root 204(*), and with differences being reflected in the parentheticals *(3) and *(1). For brevity, the discussion will focus more on differences between FIG. 2B and FIG. 2A than on similarities.

In FIG. 2B, cells 204(3) and 204(4) correspond to cells 204(1) and 204(2) of FIG. 2B. Active gate patterns 212(7), 212(8) and 212(9), and dummy gate patterns 214(4) and 214(5) of FIG. 2B correspond to active gate patterns 212(1), 212(2) and 212(3), and dummy gate patterns 214(1) and 214(2) of FIG. 2A. Active gate patterns 212(13), 212(14) and 212(15), and dummy gate patterns 214(6) and 214(7) of FIG. 2B correspond to active gate patterns 212(4), 212(5) and 212(6), and dummy gate patterns 214(2) and 214(3) of FIG. 2A.

Layout diagram 200B further includes a cell 206(1) and active gate patterns 212(10), 212(11) and 212(12). Cells 204(3), 206(1) and 204(4) are substantially abutting. Cell 206(1) is disposed in row 202 between cells 204(3) and 204(4). Cell 206(1) includes corresponding portions of active area patterns 208N and 208P. Active gate patterns 212(10), 212(11) and 212(12) are included in cell 206(1). Relative to the X-axis, portions of dummy gate patterns 214(5) and 214(6) which overlap cell 206(1) are included in cell 206(1). In some embodiments, active area patterns 208N and 208P are substantially continuous across a border between cells 204(3) and 206(1), and between cells 206(1) and 204(4), which represent correspondingly N-type and P-type CNA regions in a semiconductor device based on layout diagram 200B. Relative to the X-axis, cell 206(1) has a width of 4 CPP. In FIG. 2A, relative to the Y-axis, height of cells 204(1) and 204(2) is that of row 202. In some embodiments, cells 204(1) and 204(2) are referred to as single row height cells. In some embodiments (not shown), a height of at least one of cells 204(1) and 204(2) is that is of multiple rows (not shown).

Cell 206(1) represents a circuit. In some embodiments, cell 206(1) represents a filler circuit. In some embodiments, a filler cell region represented by filler cell 206(1) is configured to provide isolation between cell-regions represented by corresponding cells 204(3) and 204(4). In some embodiments, the gates lines of a filler cell region represented by corresponding segments of gate patterns 212(10), 212(11) and 212(12) define corresponding transistors with respect to corresponding underlying active regions, the latter being represented by active area patterns 208N and 208P. The gates lines of a filler cell region represented by corresponding segments of gate patterns 212(10), 212(11) and 212(12) are configured to receive turn-off voltages which turn off voltages for the corresponding transistors.

In some embodiments, gate patterns 212(1)-212(6) are referred to as active gate patterns because one or more gate patterns 212(1)-212(6) are designated for signals involved in providing the functions of corresponding cell regions in a semiconductor device based on layout diagram 200A, where the cell regions are represented by corresponding cells 204(1) and 204(2).

In some embodiments, one or more instances of cell 206(1) represent corresponding circuits other than filler circuits. In some embodiments, one or more instances of cell 206(1) represent a tap cell, or the like.

In some embodiments, relative to the X-axis, a filler cell region represented by filler cell 206(1) is configured to reduce leakage currents from the cell region represented by cell 204(4) to the cell region represented by cell 204(3). In FIG. 2B, the leakage currents are represented by arrows 218N and 218P along corresponding sub-rows 210N and 210P between cells 204(3) and 204(4). Leakage currents 218N and 218P are discussed in more detail below (see Table 1).

Again. different quadrant-edge configurations (QECs) result in correspondingly different types of quadrant-edge pairs (QEPs), one type of which is QEP 222 in FIG. 2B. Relative to the X-axis, there are four varieties of QEP 222: a first variety in which a source region (S) is abuttingly disposed to the left of a portion of an active area pattern proximal to a quadrant-edge of a filler cell (portion FC), for which shorthand notation is S|FC; a second variety in which a drain region (D) is abuttingly disposed to the left of a portion FC, for which a shorthand notation is D|FC; a third variety in which a portion FC is abuttingly disposed to the left of a drain region (D), for which a shorthand notation is FC|D; and a fourth variety in which a portion FC is abuttingly disposed to the left of a source region (S), for which a shorthand notation is FC|S. In some embodiments, in addition to quadrant-edges of filler cells such as filler cell 2016(1), one or more cells such as cells 204(1)-204(4) includes one or more portions FC disposed proximally and inward to corresponding quadrant-edges.

In the example of FIG. 2B: QEP 222 of sub-row 210N at the border of cells 204(3) and 206(1) is the first variety (S|FC) of QEP 222; QEP 222 of sub-row 210N at the border of cells 206(1) and 204(4) is the third variety (FC|D) of QEP 222; QEP 222 of sub-row 210P at the border of cells 204(3) and 206(1) is the second variety (D|FC) of QEP 222; and QEP 222 of sub-row 210P at the border of cells 206(1) and 204(4) is the fourth variety (FC|S) of QEP 222. In some embodiments, combinations of the varieties of QEP 222 for layout diagram 200B are different than the combination of the varieties of QEP 222 for layout diagram 200B shown in FIG. 2B.

For some embodiments, a method of generating a layout diagram produces a layout diagram for which a semiconductor device based thereon includes an arrangement of a group of cell regions which has benefits including reduced inter-cell-region current leakages, where the group of cell regions is represented by a group of corresponding cells in the layout diagram. For some embodiments, such a method includes reducing an aggregate leakage tendency of the group of cells by performing at least one of the following, namely (A) changing an orientation of at least one of the cells or (B) changing locations correspondingly of at least two of the cells. In some embodiments, the orientation of a given cell is changed by replacing the given cell with a substitute cell which is a mirror-symmetric version of the given cell. In some embodiments, to facilitate choosing which cells to change an orientation thereof and/or change a location thereof, different predetermined leakage values are assigned to corresponding types of QEPs. In some embodiments, the predetermined leakage values are as shown in Table 1 (below).

The types of QEPs include QEP 220 (FIG. 2A) and QEP 222 (FIG. 2B). In some embodiments, the types of QEPs further include QEP 224, QEP 226, QEP 228, QEP 230 and QEP 232, as shown in Table 1 (below). Though not shown in FIGS. 2A-2B: see FIG. 3J or the like regarding QEP 224; see FIG. 3B or the like regarding QEP 226. Though not shown in FIGS. 2A-2B, QEP 228, QEP 230 and QEP 232 are discussed below.

The three varieties of QEP 220 (see FIG. 2A), namely S|D, D|S and D|D, are shown in Row 1 of Table 1 with a shorthand notation S/D|D. The four varieties of QEP 222 (see FIG. 2B), namely S|FC, D|FC, FC|D and FC|S, are shown in Row 3 of Table 1 with a shorthand notation S/D|FC.

TABLE 1

| Row No. | Item No. | QEP | Leakage Value |
|---|---|---|---|
| 1 | 220 | S/D\|D | 8x |
| 2 | 224 | S/D\|FB | 2x |
| 3 | 222 | S/D\|FC | 1x |
| 4 | 226 | S\|S | 0 |
| 5 | 228 | FC\|FC | 0 |
| 6 | 230 | FC\|FB | 0 |
| 7 | 232 | FB\|FB | 0 |

In row 3 of Table 1, QEP 222 (S/D|FC) represents a unit value of leakage, namely 1x. In row 1, QEP 220 (S/D|D) has the greatest leakage value, namely 8x. In row 1, QEP 224 (S/D|FB) has leakage 2x. Each of QEP 226 (S|S) in row, QEP 228 (FC|FC) in row 5, QEP 230 (FC|FB) in row 6 and QEP 232 (FC|FB) in row 7 has a value of zero (0). In some embodiments, the predetermined values of leakage for corresponding QEPs 220-232 are empirically derived. In some embodiments, the predetermined values of leakage for corresponding QEPs 220-232 are based on simulations. In some embodiments, the predetermined values of leakage for corresponding QEPs 220-232 are based on empirical data and simulations.

Regarding QEP 226, in the context of layout diagrams such as those of FIGS. 2A-2B, relative to the X-axis, for a first cell abuttingly disposed to the left side of a second cell in a given row, and wherein the first and second abutting cells have corresponding abutting first and second quadrant-edges, QEP 226 is described as follows according to some embodiments. QEP 226 represents a QEP in which a source region (S) is abuttingly disposed to the left of the first quadrant-edge and a source region (S) is abuttingly disposed to right of the second quadrant-edge.

Regarding QEP 228, in the context of layout diagrams such as those of FIGS. 2A-2B, relative to the X-axis, for a first cell abuttingly disposed to the left side of a second cell in a given row, and wherein the first and second abutting cells have corresponding abutting first and second quadrant-edges, QEP 228 is described as follows according to some embodiments. QEP 228 represents a QEP in which a portion FC is abuttingly disposed to the left of the first quadrant-edge and a portion FC is abuttingly disposed to right of the second quadrant-edge.

Regarding QEP 230, in the context of layout diagrams such as those of FIGS. 2A-2B, relative to the X-axis, for a first cell abuttingly disposed to the left side of a second cell in a given row, and wherein the first and second abutting cells have corresponding abutting first and second quadrant-edges, QEP 230 is described as follows according to some embodiments. QEP 230 represents a QEP in which a portion FC is abuttingly disposed to the left of the first quadrant-edge and a portion FB (discussed below) is abuttingly disposed to right of the second quadrant-edge, or vice versa.

Regarding QEP 232, in the context of layout diagrams such as those of FIGS. 2A-2B, relative to the X-axis, for a first cell abuttingly disposed to the left side of a second cell in a given row, and wherein the first and second abutting cells have corresponding abutting first and second quadrant-edges, QEP 232 is described as follows according to some embodiments. QEP 232 represents a QEP in which a portion FB (again, described below) is abuttingly disposed to the left of the first quadrant-edge and a portion FB is abuttingly disposed to right of the second quadrant-edge.

In some embodiments, a portion FB is similar in some respects to a portion FC. In some embodiments, in a layout diagram, portion FC describes an area proximal to an intersection of an active area pattern and a segment of a dummy gate pattern at a quadrant-edge of a filler cell. In semiconductor device based on the layout diagram, a transistor is formed in a location corresponding to the intersection of the active area pattern and the segment of the dummy gate pattern at the quadrant-edge of a filler cell.

In portion FC, the segment of the dummy gate pattern is designated for a first voltage which turns off the transistor. Rather than being designated for the first voltage, in portion FB, the segment of the dummy gate pattern is designated for a second voltage which is different than the first voltage. In some embodiments, the first voltage for portion FC strongly turns off the transistor, and the second voltage for portion FB weakly turns off the transistor, such that portion FB exhibits greater leakage current than portion FC. In some embodiments, the weak-vs-strong turn-off relationship between portion FB and portion FC is reflected in Table 1, wherein row 2 lists QEP 224 (S/D|FB) as having a leakage value of 2×, and row 3 lists QEP 222 (S/D|FC) as having a leakage value of 1×. In some embodiments, the second voltage for portion FB is a varying control signal.

FIGS. 3A, 3B, 3D, 3F, 3H, 3J, 3L, 3N, 3Q, 3T and 3W are corresponding layout diagrams 300A, 300D, 300F, 300H, 300J, 300L, 300N, 300Q, 300T and 300W, in accordance with some embodiments.

FIGS. 3C, 3E, 3G, 3I, 3K, 3M, 3O, 3P, 3R, 3S, 3U, 3V, 3X and 3Y are corresponding tables 300C, 300E, 300G, 300I, 300K, 300M, 300O, 300P, 300R, 300S, 300U, 300V, 300X and 300Y, in accordance with some embodiments.

For some embodiments, a method of generating a layout diagram produces a layout diagram for which a semiconductor device based thereon includes an arrangement of a group of cell regions which has benefits including reduced inter-cell-region current leakages, where the group of cell regions is represented by a group of corresponding cells in the layout diagram. For some embodiments, such a method includes reducing an aggregate leakage tendency of the group of cells by performing at least one of the following, namely (A) changing an orientation of at least one of the cells or (B) changing locations correspondingly of at least two of the cells. In some embodiments, the orientation of a given cell is changed by replacing the given cell with a substitute cell which is a mirror-symmetric version of the given cell. Layout diagrams 300B, 300F, 300J, 300N and 300T represent initial layout diagrams and layout diagrams 300D, 300H, 300L, 300Q, 300W represent layout diagrams resulting from one or more methods disclosed herein, in accordance with some embodiments. FIGS. 3C, 3G, 3K, 3O, 3R, 3U and 3X represent initial values of a first figure of merit (FOM) for corresponding layout diagrams 300C, 300G, 300K, 300O, 300R, 300U and 300X, and FIGS. 3E, 3I, 3M, 3P, 3S, 3V and 3Y are represent values of the first FOM for corresponding layout diagrams 300E, 300I, 300M, 300P, 300S, 300V and 300Y which result from one or more methods disclosed herein, in accordance with some embodiments.

For simplicity of illustration, various small numbers of cells are included in the groups of layout diagrams 300C, 300G, 300K, 300O, 300R, 300U and 300X, and corresponding layout diagrams 300E, 300I, 300M, 300P, 300S, 300V and 300Y. Typically, greater, if not much greater, numbers of cells are included in such groups.

Layout diagrams 300A, 300D, 300F, 300H, 300J, 300L, 300N, 300Q, 300T and 300W are similar to layout diagrams 200A-200B of corresponding FIGS. 2A-2B, and follow a similar numbering convention. To help identify components which correspond but nevertheless have differences, the numbering convention uses parenthetical numbers, and different series of numbers, with layout diagrams 300A, 300D, 300F, 300H, 300J, 300L, 300N, 300Q, 300T and 300W using 3-series numbers, and layout diagrams 200A-200B using 2-series numbers. For example, cell 304(5)(1) in FIG. 3A and cell 204(1) in FIG. 2A are both logic cells, similarities being reflected in the common root series *04(*), 304(*) in FIG. 3A and 204(*) in FIG. 2A, and with differences being reflected in the parentheticals *(5) in FIG. 3A and *(1) in FIG. 2A. Cell 304(5)(I) uses an additional parenthetical (I), as discussed below. For brevity, the discussion will focus more on differences between FIG. 2B and FIG. 2A than on similarities.

FIG. 3A is a layout diagram 300A, in accordance with some embodiments.

FIG. 3A shows cell 304(5)(I) and a cell 304(5)(M). Relative to a mirror plane 301 which is substantially orthogonal to the X-axis and the Y-axis, an orientation of cell 304(5)(I) has been changed to form cell 304(5)(M). More particularly, cell 304(5)(M) is a mirror symmetric version of cell 304(5)(I). The parenthetical ***(*)(I) in 304(5)(I) indicates an initial orientation of cell 304(5)(I). The parenthetical ***(*)(M) in 304(5)(M) indicates a mirror symmetric orientation of cell 304(5)(M) with respect to corresponding cell 304(5)(I).

Figures 3D, 3E:
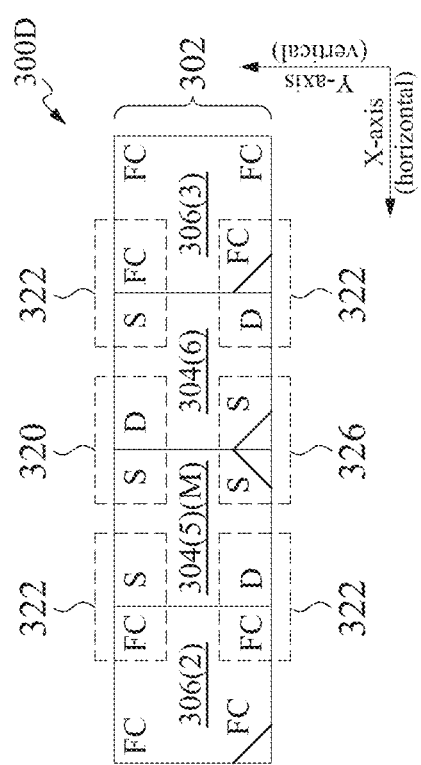

FIG. 3B and FIG. 3D are corresponding layout diagrams 300B and 300D, in accordance with some embodiments.

FIG. 3C and FIG. 3E are corresponding tables 300C and 300E, in accordance with some embodiments.

Layout diagram 300B represents an initial layout diagram and layout diagram 300D represents a layout diagram resulting from one or more methods disclosed herein, in accordance with some embodiments. FIG. 3C represents an initial value of the first FOM for layout diagram 300B of FIG. 3B, and FIG. 3E represents a value of the first FOM for corresponding layout diagram 300E which results one or more methods disclosed herein, in accordance with some embodiments.

Layout diagram 300B includes a group of substantially abutting cells 306(2), 304(5)(I), 304(6) and 306(3) arranged in a left-to-right sequence as follows: cells 306(2), 304(5)(I), 304(6) and 306(3).

Layout diagram 300D includes a group of substantially abutting cells 306(2), 304(5)(M), 304(6) and 306(3) arranged in a left-to-right sequence as follows: cells 306(2), 304(5)(M), 304(6) and 306(3). In layout diagram 300E, cell 304(5)(M) has been substituted for corresponding cell 304(5)(I) in layout diagram 300B, where cell 304(5)(M) is a mirror symmetric version of cell 304(5)(I).

In layout diagram 300B, there are: two instances of QEP 320 (S/D|D), as reflected in row 1 of Table 300C; four instances of QEP 322 (S/D|FC), as reflected in row 2 of Table 300C; no instances of QEP 324 (S/D|FB), as reflected in row 3 of Table 300C; and no instances of QEP 326 (S|S), as reflected in row 4 of Table 300C.

Because Table 300C reflects totals before having applied one or more methods disclosed herein, each of the totals in Table 300C is referred to as a total_ante (TA) total. The TA total number of instances of QEPs in layout diagram 300B is 6, as shown in row 5 of Table 300C.

It is to be recalled that the predetermined leakage value for QEP 320 (S/D|D) in row 1 of Table 1 is 8×. Accordingly, in row 1 of Table 300C, the leakage attributed to the two instances of QEP 320 (S/D|D) is 2*8×. It is to be recalled that the predetermined leakage value for QEP 322 (S/D|FC) in row 3 of Table 1 is 1×. Accordingly, in row 2 of Table 300C, the leakage attributed to the four instances of QEP 322 (S/D|FC) is 4*1×. Accordingly, the TA total leakage for layout diagram 300B is 20×, as shown in row 5 of Table 300C. In some embodiments, the total leakage represents the first figure of merit (FOM).

In layout diagram 300E, there are: one instance of QEP 320 (S/D|D), as reflected in row 1 of Table 300E; four instances of QEP 322 (S/D|FC), as reflected in row 2 of Table 300E; no instances of QEP 324 (S/D|FB), as reflected in row 3 of Table 300E; and one instance of QEP 326 (S|S), as reflected in row 4 of Table 300E.

Because Table 300E reflects totals after having applied one or more methods disclosed herein, each of the totals in Table 300E is referred to as a total_post (TP) total. The TP total number of instances of QEPs in layout diagram 300E is 6, as shown in row 5 of Table 300E, which is the same as for layout diagram 300B.

In layout diagram 300D, the number of instances of QEP 320 (S/D|D) has decreased, and the number of instances of QEP 326 (S|S) has increased. It is to be recalled that the predetermined leakage value for QEP 326 (S|S) in row 4 of Table 1 is 0. Accordingly, in row 3 of Table 300C300E, the leakage attributed to the zero instances of QEP 326 (S|S) is 0. Also, in row 3 of Table 300C300E, the leakage attributed to the one instance of QEP 320 (S/D|D) is 1*8x. Otherwise, rows 2 and 3 of Table 300E are the same as rows 2 and 3 of Table 300C. Accordingly, the TP total leakage for layout diagram 300E is 12x, as shown in row 5 of Table 300E. Changing the orientation of cell 304(5)(I) in layout diagram 300B by replacing the same with cell 304(5)(M) in layout diagram 300E has benefits including reducing the leakage current by about 60%, where TP_leak≈60%*TA_leak.

Figures 3F, 3G:
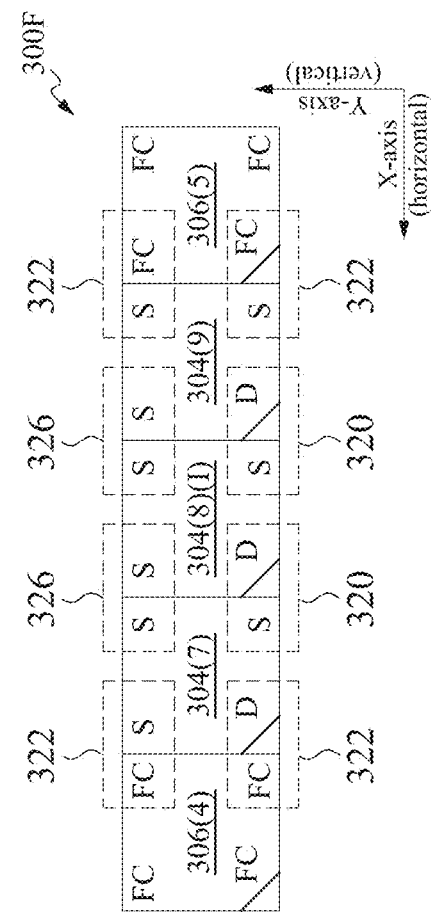
Figures 3H, 3I:
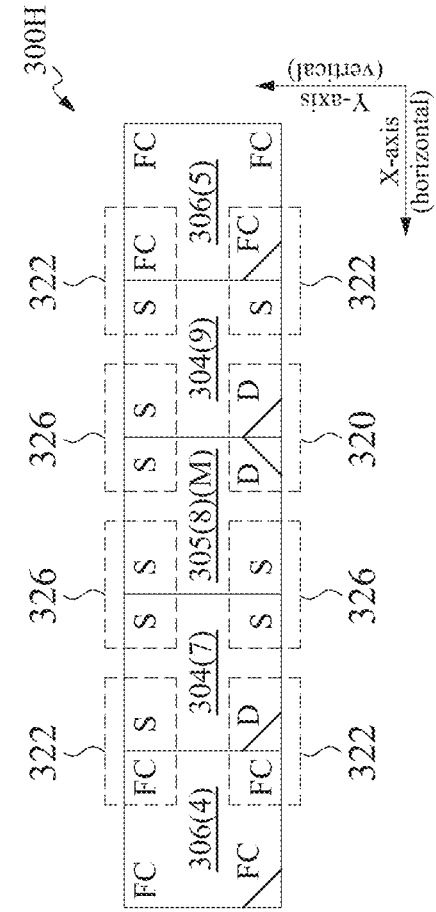

FIG. 3F and FIG. 3H are corresponding layout diagrams 300F and 300H, in accordance with some embodiments.

FIG. 3G and FIG. 3I are corresponding tables 300G and 300I, in accordance with some embodiments.

Layout diagram 300F represents an initial layout diagram and layout diagram 300H represents a layout diagram resulting from one or more methods disclosed herein, in accordance with some embodiments. FIG. 3G represents an initial value of the first FOM for layout diagram 300F of FIG. 3F, and FIG. 3I represents a value of the first FOM for corresponding layout diagram 300I which results one or more methods disclosed herein, in accordance with some embodiments.

Layout diagram 300F includes a group of substantially abutting cells 306(4), 304(7), 304(8)(I), 304(9) and 306(5) arranged in a left-to-right sequence as follows: cells 306(4), 304( ), 304(8)(I), 304(9) and 306(5).

Layout diagram 300H includes a group of substantially abutting cells 306(4), 304(7), 304(8)(M), 304(9) and 306(5) arranged in a left-to-right sequence as follows: cells 306(4), 304(7), 304(8)(M), 304(9) and 306(5). In layout diagram 300I, cell 304(8)(M) has been substituted for corresponding cell 304(8)(I) in layout diagram 300F, where cell 304(8)(M) is a mirror symmetric version of cell 304(8)(I).

Changing the orientation of cell 304(8)(I) in layout diagram 300F by replacing the same with cell 304(8)(M) in layout diagram 300I has benefits including reducing the leakage current by about 60%, where TP_leak≈60%*TA_leak.

Figures 3J, 3K:
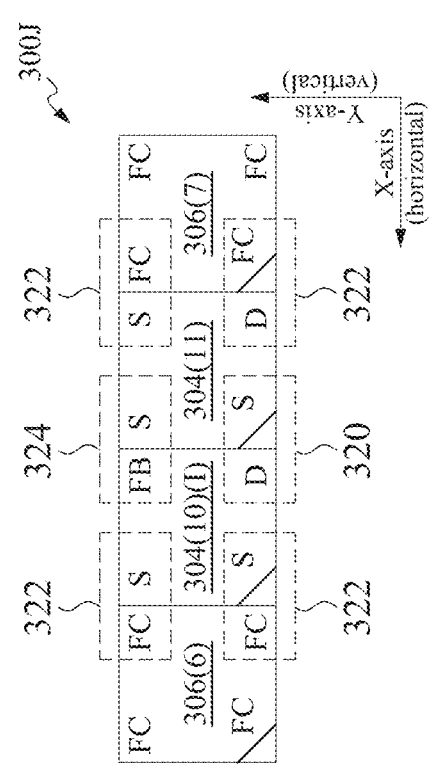
Figures 3L, 3M:
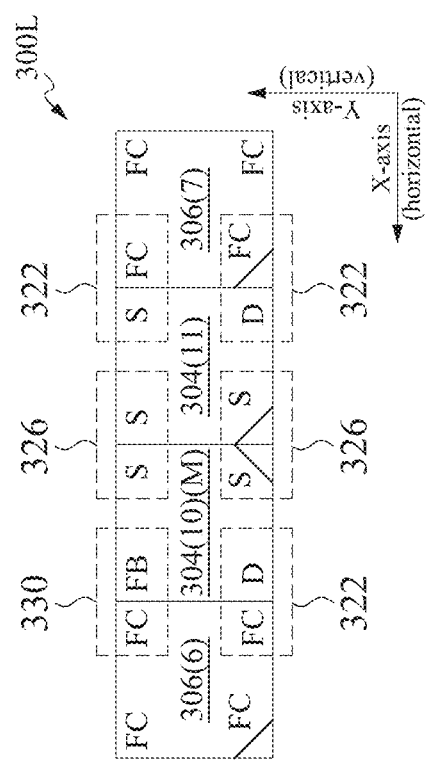

FIG. 3J and FIG. 3L are corresponding layout diagrams 300J and 300L, in accordance with some embodiments.

FIG. 3K and FIG. 3M are corresponding tables 300K and 300M, in accordance with some embodiments.

Layout diagram 300J represents an initial layout diagram and layout diagram 300L represents a layout diagram resulting from one or more methods disclosed herein, in accordance with some embodiments. FIG. 3K represents an initial value of the first FOM for layout diagram 300J of FIG. 3J, and FIG. 3M represents a value of the first FOM for corresponding layout diagram 300M which results one or more methods disclosed herein, in accordance with some embodiments.

Layout diagram 300J includes a group of substantially abutting cells 306(6), 304(10)(I), 304(11) and 306(7) arranged in a left-to-right sequence as follows: cells 306(6), 304(10)(I), 304(11) and 306(7).

Layout diagram 300L includes a group of substantially abutting cells 306(6), 304(10)(M)), 304(11) and 306(7) arranged in a left-to-right sequence as follows: 306(6), 304(10)(M)), 304(11) and 306(7). In layout diagram 300M, cell 304(10)(M) has been substituted for corresponding cell 304(10)(I) in layout diagram 300J, where cell 304(10)(M) is a mirror symmetric version of cell 304(10)(I).

As contrasted with layout diagrams 300B, 300D, 300F and 300H, layout diagram 300J includes (among other QEPs) one instance of QEB 324 (S/D|FB).

It is to be recalled that the predetermined leakage value for QEP 324 (S/D|FB) in row 2 of Table 1 is 2x. Accordingly, in row 3 of Table 300K, the leakage attributed to the one instance of QEP 324 (S/D|FB) is 1*2x. The TA total leakage for layout diagram 300J is 14x, as shown in row 7 of Table 300K. The TP total leakage for layout diagram 300M is 3x, as shown in row 7 of Table 300M. Changing the orientation of cell 304(10)(I) in layout diagram 300J by replacing the same with cell 304(10)(M) in layout diagram 300M has benefits including reducing the leakage current by about 21%, where TP_leak≈21%*TA_leak.

In some embodiments, the figure of merit takes into account the effects on leakage currents introduced by differing threshold voltages of transistors in the corresponding cell regions. In some embodiments, the effects of differing threshold voltages are reflected in a leakage multiplier. In some embodiments, the leakage multipliers are shown in Table 2 (below).

TABLE 2

| Row No. | VT Type | Leakage_Value (N) | Leakage_Value (LL) |
|---|---|---|---|
| 1 | SVT | 4y | 1y |
| 2 | LVT | 40y | 10y |
| 3 | ULVT | 400y | 100y |
| 4 | ELVT | 800y | NA |

Table 2 includes a column entitled "Leakage_Value (N)" which represents a normal-leakage transistor technology, and a column entitled "Leakage_Value (LL)" which represents a corresponding low leakage transistor technology. Within each transistor technology, there are four types of threshold voltages, which are reflected in Table 2 as follows: a standard threshold voltage type SVT in row 1; a low threshold voltage type LVT in row 2; an ultra low threshold voltage type ULVT in row 3; and an extremely low threshold voltage type ELVT in row 4.

Figure 3N:
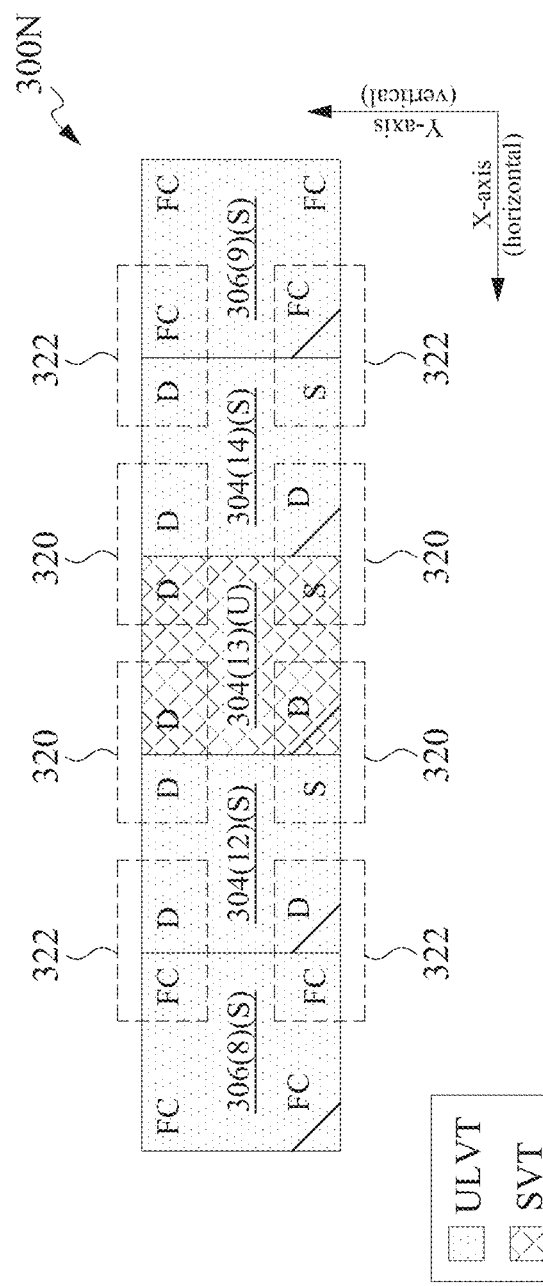
Figure 3Q:
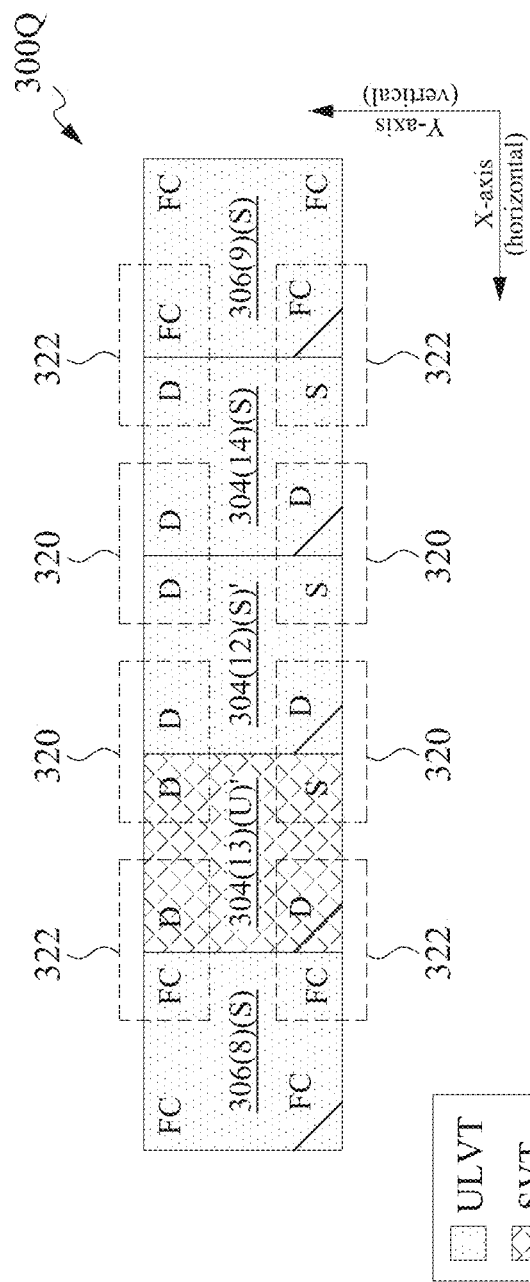

FIG. 3N and FIG. 3Q are corresponding layout diagrams 300N and 300Q, in accordance with some embodiments.

FIG. 3O and FIG. 3R are corresponding tables 300O and 300R, in accordance with some embodiments.

Layout diagram 300N represents an initial layout diagram and layout diagram 300Q represents a layout diagram resulting from one or more methods disclosed herein, in accordance with some embodiments. FIG. 3O represents an initial value of the first FOM for layout diagram 300N of FIG. 3N, and FIG. 3R represents a value of the first FOM for corresponding layout diagram 300R which results one or more methods disclosed herein, in accordance with some embodiments.

Layout diagram 300N includes a group of substantially abutting cells 306(8)(S), 304(12)(S), 304(13)(U), 304(14)(S) and 306(9)(S) arranged in a left-to-right sequence as follows: cells 306(8)(S), 304(12)(S), 304(13)(U), 304(14)(S) and 306(9)(S).

Layout diagram 300Q includes a group of substantially abutting cells 306(8)(S), 304(13(U)', 304(12(S)', 304(14)(S) and 306(9)(S) arranged in a left-to-right sequence as follows: cells 306(8)(S), 304(13)(U)', 304(12)(S)', 304(14)(S) and 306(9)(S). In layout diagram 300R, cells 304(12)(S)' and 304(13)(U)' have swapped positions as compared to the positions of corresponding cells 304(12)(S) and 304(13)(U) in layout diagram 300N.

The numbering convention of layout diagrams 300N and 300Q adds an additional parenthetical ***(*)(S) or ***(*)(U), and (in some instances) a prime (') suffix. For example, the parenthetical ***(*)(S) in 304(12)(S) indicates that cell 304(12)(S) is designated for a standard threshold voltage SVT; see row 1 of Table 2. For example, the parenthetical ***(*)(U) in 304(12)(S) indicates that cell 304(12)(S) is designated for an ultra-low threshold voltage ULVT; see row 3 of Table 2. Though not shown in FIG. 3N, the parenthetical ***(*)(L) indicates that the corresponding cell is designated for a low threshold voltage ULVT; see row 3 of Table 2. Though not shown in FIG. 3N, the parenthetical ***(*)(E) indicates that the corresponding cell is designated for an extremely low threshold voltage ULVT; see row 4 of Table 2.

In some embodiments, the effectiveness of the swapping of cells is assessed by considering a first perspective of the cells which have a higher threshold voltage, and separately considering a second perspective of the cells which have a lower threshold voltage. In some embodiments, the swapping is regarded as having merit if at least one of the first or second perspectives shows a reduced leakage current and neither of the first and second perspectives shows an increased leakage current.

Tables 300O of FIGS. 3O and 300R of FIG. 3R are populated with values relative to a perspective of the cells which have the higher threshold voltage. More particularly, where a QEP is formed between a first cell having a relatively higher threshold voltage and a second cell having a relatively lower threshold voltage, the leakage contribution of the QEP is accounted for in a row of Tables 300O and 300R corresponding to the higher threshold voltage. In layout diagram 300N, there are four such QEPs, namely, an upper and a lower QEP formed between cell 304(12)(S) and cell 304(13)(U), and an upper and lower QEP formed between cell 304(13)(U) and cell 304(14)(S). The noted QEPs are accounted in corresponding ones of rows 7-12 in each of Tables 300O and 300R, which correspond to the higher threshold voltage.

Tables 300P of FIG. 3P and 300S of FIG. 3S are populated with values relative to a perspective of the cells which have the lower threshold voltage. More particularly, where a QEP is formed between a first cell having a relatively higher threshold voltage and a second cell having a relatively lower threshold voltage, the leakage contribution of the QEP is accounted for in a row of Tables 300P and 300S corresponding to the lower threshold voltage. In layout diagram 300Q, there are four such QEPs, namely, an upper and a lower QEP formed between cell 306(8)(S) and cell 304(13)(U)', and an upper and lower QEP formed between cell 304(13)(U)' and cell 304(12)(S)'. The noted QEPs are accounted in corresponding ones of rows 1-6 in each of Tables 300P and 300S, which correspond to the lower threshold voltage.

From the perspective of the lower threshold voltage (see corresponding Tables 300P and 300S), swapping positions of cells 304(12)(S) and 304(13)(U) in layout diagram 300N to the positions of cells 304(12)(S)' and 304(13)(U)' in layout diagram 300Q has benefits including reducing the leakage current by about 63%, where TP_leak≈63%*TA_leak. From the perspective of the higher threshold voltage (see corresponding Tables 300O and 300R), swapping positions of cells 304(12)(S) and 304(13)(U) in layout diagram 300N to the positions of cells 304(12)(S)' and 304(13)(U)' in layout diagram 300Q does not increase the leakage current, rather the leakage current remains substantially the same. Accordingly, in this example, the swapping is regarded as beneficial because the perspective of the lower threshold voltage shows a reduction in leakage current while the perspective of the higher threshold voltage does not show an increased leakage current.

Figure 3T:
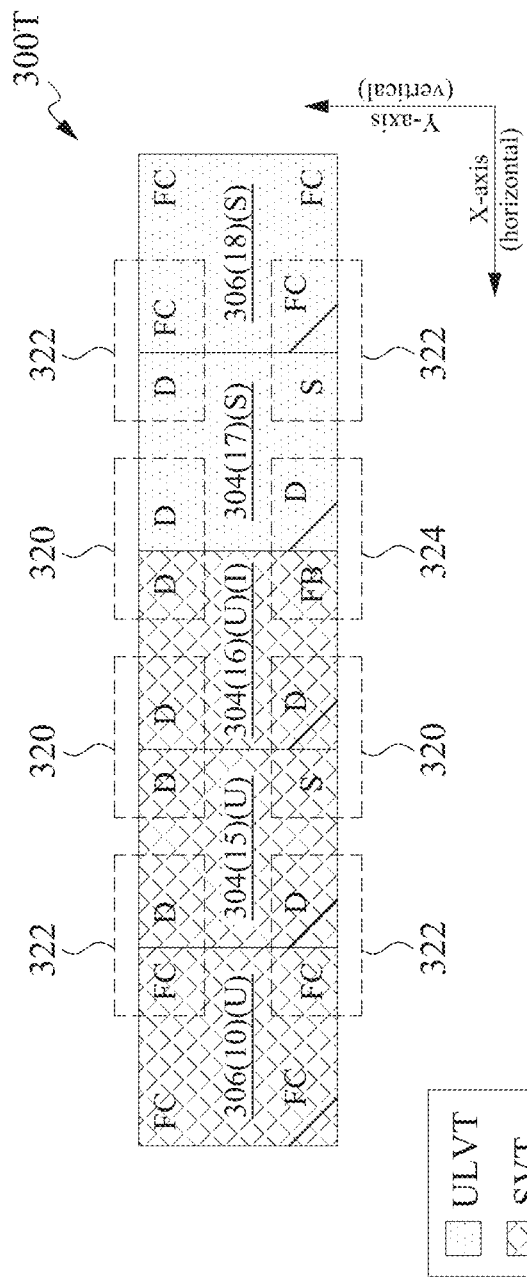
Figure 3W:
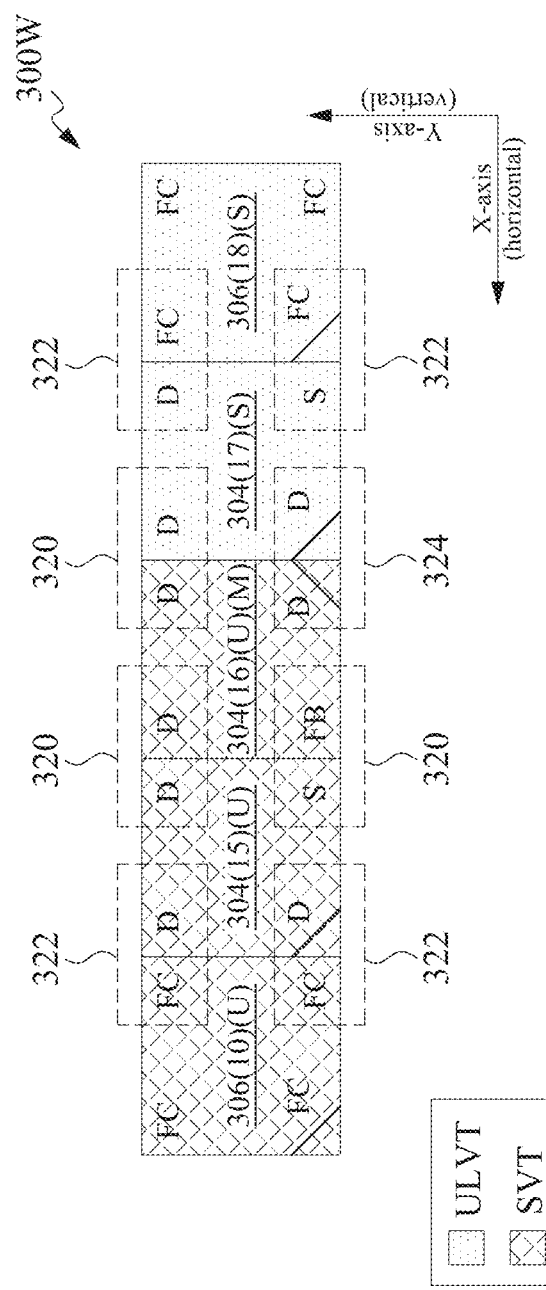

FIG. 3T and FIG. 3W are corresponding layout diagrams 300T and 300W, in accordance with some embodiments.

FIG. 3U and FIG. 3X are corresponding tables 300U and 300X, in accordance with some embodiments.

Layout diagram 300T represents an initial layout diagram and layout diagram 300W represents a layout diagram resulting from one or more methods disclosed herein, in accordance with some embodiments. FIG. 3U represents an initial value of the first FOM for layout diagram 300T of FIG. 3T, and FIG. 3X represents a value of the first FOM for corresponding layout diagram 300X which results one or more methods disclosed herein, in accordance with some embodiments.

Layout diagram 300T includes a group of substantially abutting cells 306(10)(U), 304(15)(U), 304(16)(U)(I), 304(17)(S) and 306(18)(S) arranged in a left-to-right sequence as follows: cells 306(10)(U), 304(15)(U), 304(16)(U)(I), 304(17)(S) and 306(18)(S).

Layout diagram 300W includes a group of substantially abutting cells 306(10)(U), 304(15)(U), 304(16)(U)(M), 304(17)(S) and 306(18)(S) arranged in a left-to-right sequence as follows: cells 306(10)(U), 304(15)(U), 304(16)(U)(M), 304(17)(S) and 306(18)(S). In layout diagram 300W, cell 304(16)(U)(M) has been substituted for corresponding cell 304(16)(U)(I) in layout diagram 300T, where cell 304(16)(U)(M) is a mirror symmetric version of cell 304(16)(U)(I).

Tables 300U of FIG. 3U and 300X of FIG. 3X are populated with values relative to a perspective of the cells which have the higher threshold voltage. More particularly, where a QEP is formed between a first cell having a relatively higher threshold voltage and a second cell having a relatively lower threshold voltage, the leakage contribution of the QEP is accounted for in a row of Tables 300O and 300R corresponding to the higher threshold voltage. Rows 7-12 in each of Tables 300O and 300R correspond to the higher threshold voltage.

Tables 300V of FIG. 3V and 300Y of FIG. 3Y are populated with values relative to a perspective of the cells which have the lower threshold voltage. More particularly, where a QEP is formed between a first cell having a relatively higher threshold voltage and a second cell having a relatively lower threshold voltage, the leakage contribution of the QEP is accounted for in a row of Tables 300V and 300Y corresponding to the lower threshold voltage. Rows 1-6 in each of Tables 300V and 300Y correspond to the lower threshold voltage.

From the perspective of the higher threshold voltage (see corresponding Tables 300U and 300X, changing the orientation of cell 304(16)(U)(I) in layout diagram 300T by replacing the same with cell 304(16)(U)(M) in layout diagram 300W has benefits including reducing the leakage current by about 56%, where TP_leak≈56%*TA_leak. From the perspective of the lower threshold voltage (see corresponding Tables 300V and 300Y, changing the orientation of cell 304(16)(U)(I) in layout diagram 300T by replacing the same with cell 304(16)(U)(M) in layout diagram 300W does not increase the leakage current, rather the leakage current remains substantially the same. Accordingly, in this example, the swapping is regarded as beneficial because the perspective of the higher threshold voltage shows a reduction in leakage current while the perspective of the lower threshold voltage does not show an increased leakage current.

Figure 4A:
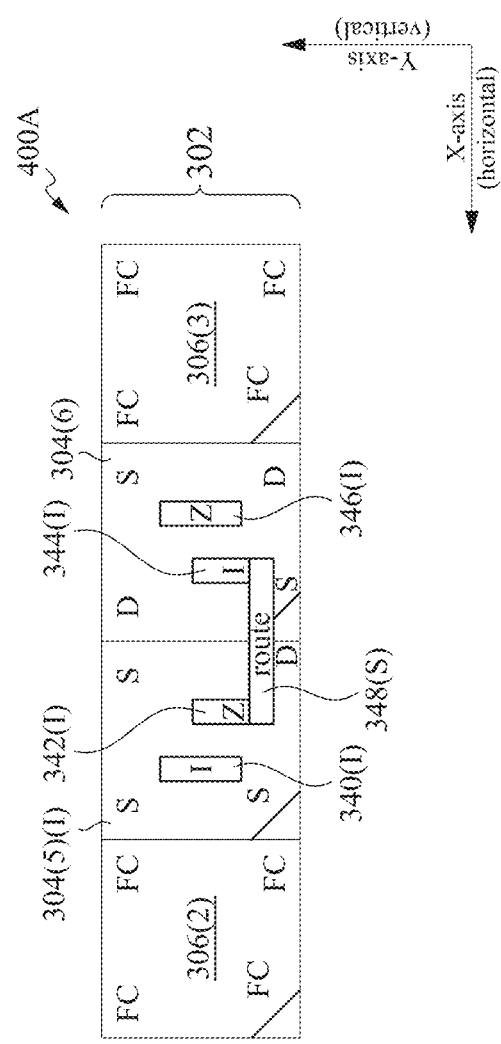
FIGS. 4A, 4B and 4C are corresponding layout diagrams, in accordance with some embodiments.
Figure 4B:
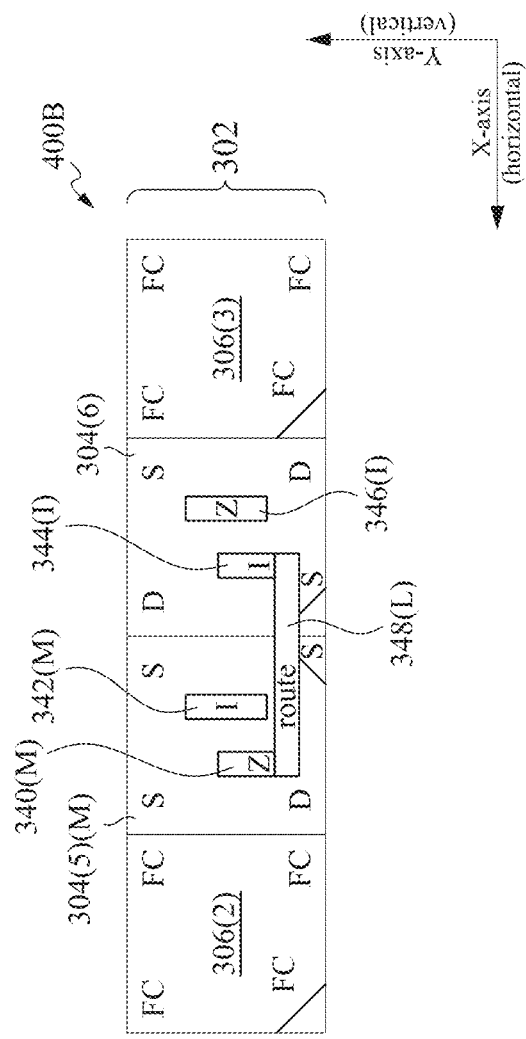
Figure 4C:
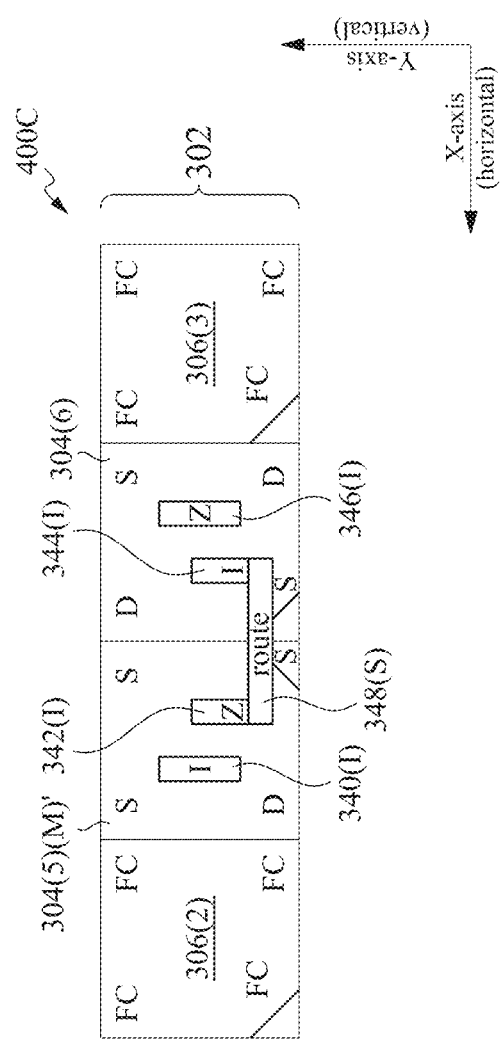

FIGS. 4A, 4B and 4C are corresponding layout diagrams 400A, 400B and 400C, in accordance with some embodiments.

For some embodiments, a method of generating a layout diagram produces a layout diagram for which a semiconductor device based thereon includes an arrangement of a group of cell regions which has benefits including reduced inter-cell-region current leakages, where the group of cell regions is represented by a group of corresponding cells in the layout diagram. For some embodiments, such a method includes reducing an aggregate leakage tendency of the group of cells by performing at least one of the following, namely (A) changing an orientation of at least one of the cells or (B) changing locations correspondingly of at least two of the cells. In some embodiments, the orientation of a given cell is changed by replacing the given cell with a first substitute cell which is a mirror-symmetric version of the given cell. Layout diagram 400A represents an initial layout diagram and layout diagram 400B represents a layout diagram resulting from one or more methods disclosed herein to layout diagram 400A, in accordance with some embodiments. In some embodiments for which overlying wiring patterns of the given cell have a first arrangement and overlying wiring patterns of the first substitute cell have a second arrangement, the method further includes replacing the first substitute cell with a cell substitute cell which is a mirror-symmetric version of the given cell in terms of QEPs and for which overlying wiring patterns have the first arrangement. Layout diagram 400C represents a layout diagram resulting from one or more methods disclosed herein having been applied to layout diagram 400B, in accordance with some embodiments.

For simplicity of illustration, four cells are included in the groups of layout diagrams 400A, 400B and 400C. Typically, greater, if not much greater, numbers of cells are included in such groups.

Layout diagrams 400A-400C are similar to layout diagrams 200A-200B, 300A, 300D, 300F, 300H, 300J, 300L, 300N, 300Q, 300T and 300W, and follow a similar numbering convention. For brevity, the discussion will focus more on differences between FIG. 2B and FIG. 2A than on similarities.

In particular, layout diagram 400A is similar to layout diagram 300B and includes a group of substantially abutting cells 306(2), 304(5)(I), 304(6) and 306(3) arranged in a left-to-right sequence as follows: cells 306(2), 304(5)(I), 304(6) and 306(3).

In particular, layout diagram 400B is similar to layout diagram 300D and includes a group of substantially abutting cells 306(2), 304(5)(M), 304(6) and 306(3) arranged in a left-to-right sequence as follows: cells 306(2), 304(5)(M), 304(6) and 306(3). In layout diagram 400B, cell 304(5)(M) has been substituted for corresponding cell 304(5)(I) in layout diagram 400A, where cell 304(5)(M) is a mirror symmetric version of cell 304(5)(I).

In layout diagram 400A, among other things, cell 304(5)(I) further includes input (pin) pattern 340(I) and output (pin) pattern 342(I). Cell 304(6) further includes input (pin) pattern 344(I) and output (pin) pattern 346(I). Layout diagram 400A further includes a routing pattern 348(S) which, relative to the X-axis, has a first length L1 and overlaps output (pin) pattern 342(I) and input (pin) pattern 244(I). The arrangement of input (pin) pattern 340(I) and output (pin) pattern 342(I) in cell 302(5)(I) is a first arrangement which contributes to routing pattern 348(S) having the length L1.

In layout diagram 400B, changing the orientation of cell 304(5)(I) in layout diagram 400A by replacing the same with cell 304(5)(M) in layout diagram 400B results in a second arrangement of input (pin) pattern 340(I) and output (pin) pattern 342(I) in cell 304(5)(M), and consequently in a revised routing pattern 348(L). Relative to the X-axis, routing pattern has a second length L2.

While layout diagram 400B has lower leakage than layout diagram 400A, nevertheless, routing segment 348(L) of layout diagram 400B is longer than routing pattern 348(S) of layout diagram 400A, namely L1<L2. In some circumstances, the longer length L2 of routing pattern 348(L) might be less desirable, e.g., in terms of propagation delay, electromigration, capacitive coupling, routability, or the like. Accordingly, one or more methods disclosed herein are applied to layout diagram 4004, in accordance with some embodiments, resulting in layout diagram 400C.

In layout diagram 400C, cell 304(5)(M) of layout diagram 400B is replaced with cell 304(5)(M)'. In terms of QEPs, cell 304(5)(M)' of layout diagram 400C is the same as cell 304(5)(M) of layout diagram 400B. However, like cell 304(5)(I) of layout diagram 400A, cell 304(5)(M)' of layout diagram 400C has the first arrangement of input (pin) pattern 340(I) and output (pin) pattern 342(1) rather than the second arrangement of input (pin) pattern 340(I) and output (pin) pattern 342(I) as in cell 304(5)(M).

In layout diagram 400C, substituting cell 304(5)(M)' for cell 304(5)(M) of layout diagram 400B reverts to routing pattern 348(S), which is shorter than routing pattern 348(L). In some circumstances, the shorter length L1 of routing pattern 348(S) is more desirable, e.g., in terms of propagation delay, electromigration, capacitive coupling, routability, or the like.

Figure 5:
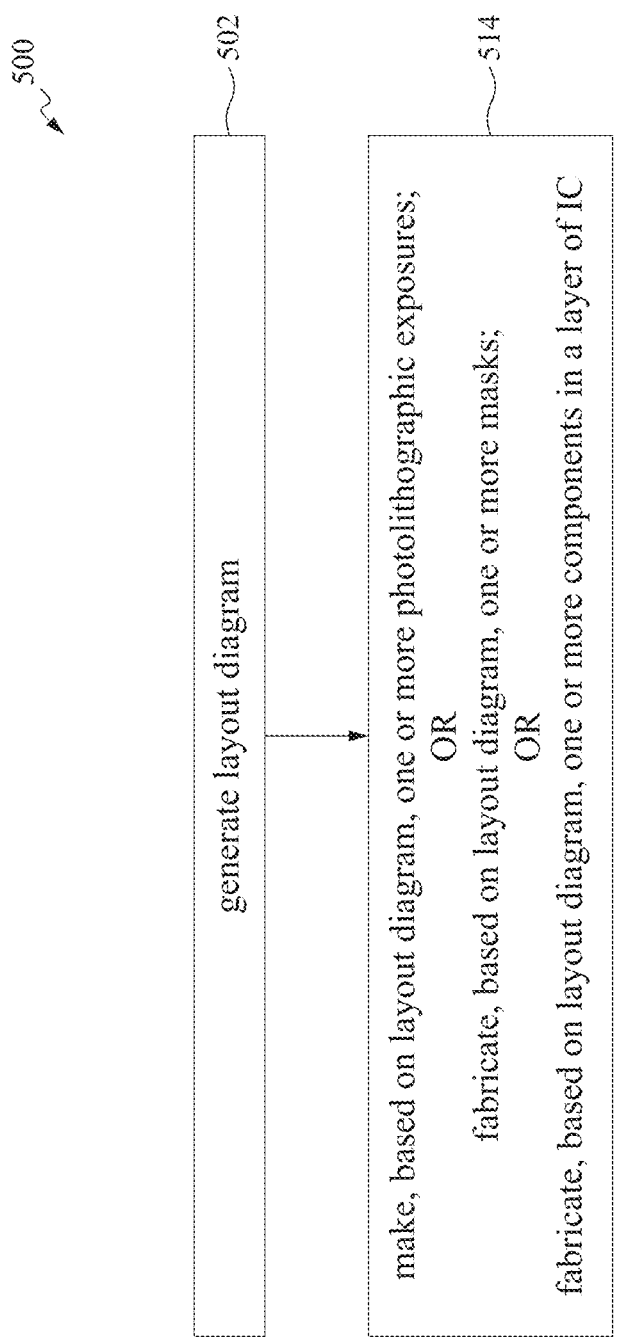
FIG. 5 is a flowchart of a method, in accordance with some embodiments.

FIG. 5 is a flowchart of a method 500 of manufacturing a semiconductor device, in accordance with some embodiments.

Examples of a semiconductor device which can be manufactured according to method 500 include semiconductor device 100 FIG. 1.

In FIG. 5, method 500 includes blocks 502-504. At block 504, a layout diagram is generated which, among other things, includes an arrangement which reduces inter-cell leakage (reduced inter-cell leakage arrangement (RICL arrangement)). An example of a semiconductor device including a RICL arrangement corresponding to the RICL arrangement in the layout generated by method 500 includes is semiconductor device 100 of FIG. 1. Block 502 is discussed in more detail below with respect to FIG. 6A. From block 502, flow proceeds to block 504.

At block 504, based on the layout diagram, at least one of (A) one or more semiconductor masks or (B) at least one component in a layer of a semiconductor device is fabricated. See discussion below of FIG. 8. In some embodiments, the fabricating further includes performing one or more lithographic exposures based on the revised layout diagram.

Figure 6A:
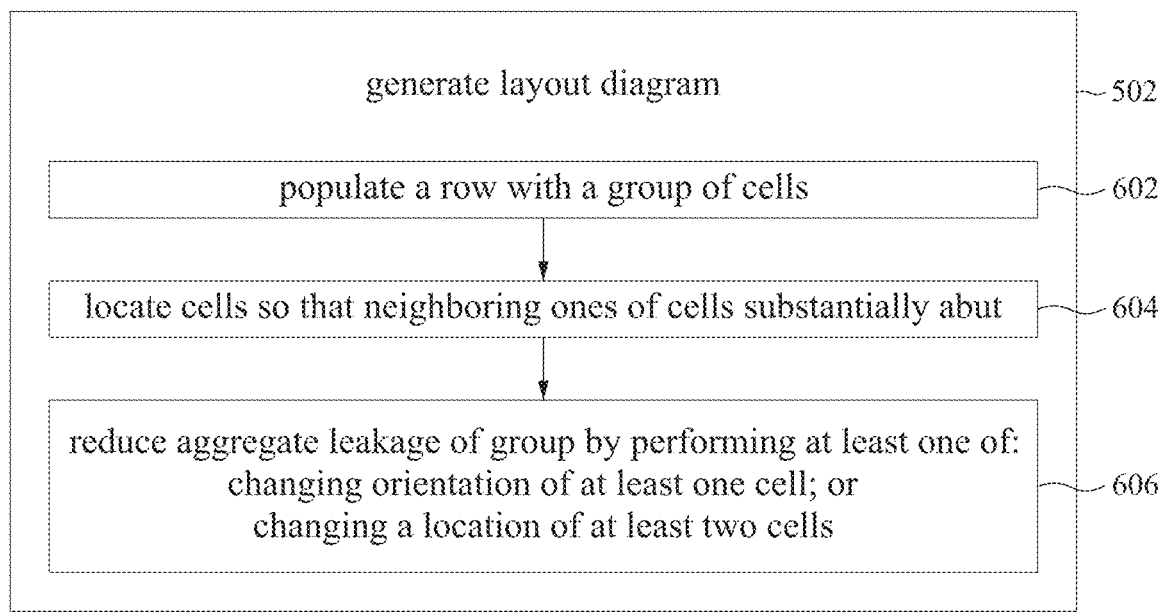
FIGS. 6A-6D are corresponding flowcharts of corresponding methods, in accordance with some embodiments.

FIG. 6A is a flowchart of a method of generating a layout diagram, in accordance with some embodiments.

More particularly, the method of FIG. 6A shows block 502 of FIG. 5 in more detail, in accordance with one or more embodiments.

Examples of layout diagrams which can be generated according to the method of FIG. 6A include the layout diagrams disclosed herein, or the like. In some embodiments, the layout diagram and versions thereof are stored on a non-transitory computer-readable medium, e.g., stored as layout diagram(s) 708 in computer-readable medium 704 in FIG. 7 (discussed below). The method of FIG. 6A is implementable, for example, using EDA system 700 (FIG. 7, discussed below), in accordance with some embodiments. Examples of a semiconductor device which can be manufactured based on layout diagrams generated according to the method of FIG. 6A include semiconductor device 100 FIG. 1, and semiconductor devices based on layout diagrams 300D, 300H, 300L, 300Q, 300W, 400B or 400C, or the like.

In FIG. 6A, block 502 includes blocks 602-606. At block 602, a row in the layout diagram is populated with a group of cells. Examples of the group of cells include the groups of cells in layout diagrams 300B, 300F, 300J, 300N, 300T or 400A, or the like. From block 602, flow proceeds to block 604.

At block 604, cells in the group are located so that neighboring ones of the cells are substantially abutting. Examples of abutting cells in the group include the cells in layout diagrams 300B, 300F, 300J, 300N, 300T or 400A, or the like. From block 604, flow proceeds to block 606.

At block 606, an aggregate leakage in the group is reduced by performing at least one of changing an orientation of at least one cell, or changing a location of at least one cell. Examples of having changed the orientation of at least one cell include layout 300D, 300H, 300L, 300W, 400B, or the like. An example of having changed the location of at least one cell is layout diagram 300Q, or the like.

Figure 6B:
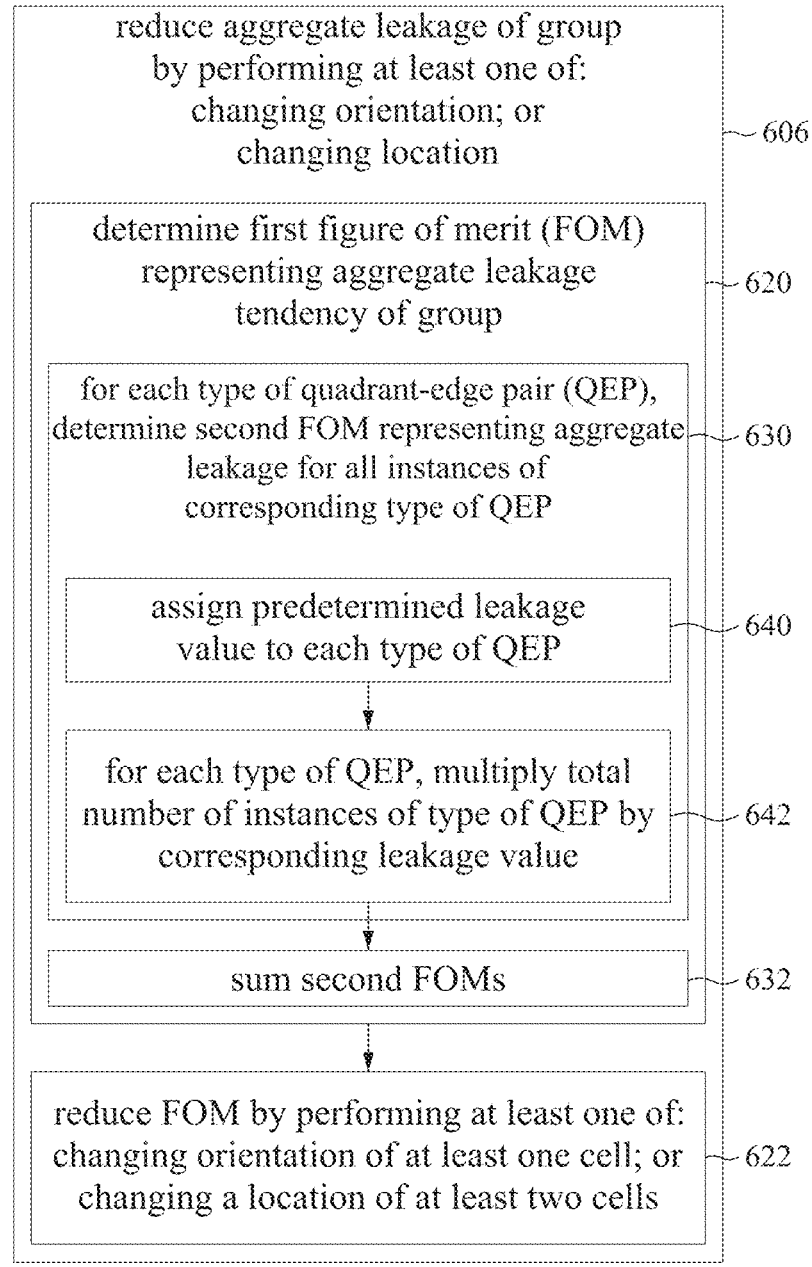

FIG. 6B is a flowchart of a method of generating a layout diagram, in accordance with some embodiments.

More particularly, the method of FIG. 6B shows block 606 of FIG. 6A in more detail, in accordance with one or more embodiments.

Examples of layout diagrams which can be generated according to the method of FIG. 6B include the layout diagrams disclosed herein, or the like. In some embodiments, the layout diagram and versions thereof are stored on a non-transitory computer-readable medium, e.g., stored as layout diagram(s) 708 in computer-readable medium 704 in FIG. 7 (discussed below). The method of FIG. 6B is implementable, for example, using EDA system 700 (FIG. 7, discussed below), in accordance with some embodiments. Examples of a semiconductor device which can be manufactured based on layout diagrams generated according to the method of FIG. 6B include semiconductor device 100 FIG. 1, and semiconductor devices based on layout diagrams 300D, 300H, 300L, 300W, 400B or 400C, or the like.

In FIG. 6B, block 606 includes blocks 620-622. At block 620, a first figure of merit (FOM) is determined, where the first FOM represents a leakage tendency of the group of cells. An example of the first FOM is the total leakage value for a given group, such as the TA total leakage shown in Tables 300C, 300G, 300K, 300O, 300R or 300X shown in corresponding FIGS. 3C, 3G, 3K, 3O, 3R, 3U and 3X, of the like.

In some embodiments, block 620 includes blocks 630-632. At block 630, for each type of quadrant-edge pair (QEP), a second FOM is determined, the second FOM representing an aggregate leakage for all instances of the corresponding type of QEP. An example of the second FOM is the TA sub-total leakage for all instances of the corresponding type of QEP, such as are shown in various QEP rows of Tables 300C, 300G, 300K, 300O, 300R or 300X. As a more particular example, consider FIG. 3K, where rows 1-6 of Table 300K show the TA sub-total leakage for the corresponding six types of QEP.

In some embodiments, block 630 includes blocks 640-642. At block 642, a predetermined leakage value is assigned to each type of QEP. An example of assigning predetermined leakage values to types of QEPs is Table 1 (discussed above). From block 640, flow proceeds to block 642.

At block 642, for each type of QEP, the total number of instances of the type of QEP is multiplied by the corresponding leakage value. Continuing the more particular example of FIG. 3K above, examples of such multiplication are shown in rows 1-6 of Table 300K, where the TA sub-total leakage for the corresponding six types of QEP is shown as an arithmetic product of the total number of instances of the type of QEP and the corresponding leakage value. From block 642, flow exits block 620. From block 620, flow proceeds to block 630.

At block 630, the second FOMs are summed. Continuing the more particular example of FIG. 3K above, an example of such a summation is shown in rows 7 of Table 300K. From block 632, flow exits block 620. From block 620, flow proceeds to block 622.

At block 622, the first FOM is reduced by performing at least one of changing an orientation of at least one cell, or changing a location of at least one cell. Examples of having changed the orientation of at least one cell include layout 300D, 300H, 300L, 300W, 400B, or the like. An example of having changed the location of at least one cell is layout diagram 300Q, or the like. In some embodiments, the predetermined leakage values assigned to the various types of QEP, e.g., Table 1, are used to prioritize cells which are being considered for having an orientation thereof changed and/or a location thereof relocated. In some embodiments, the leakage multipliers which reflect the effects of differing threshold voltages, e.g., Table 2, are used to prioritize cells which are being considered for having an orientation thereof changed and/or a location thereof relocated.

Figure 6C:
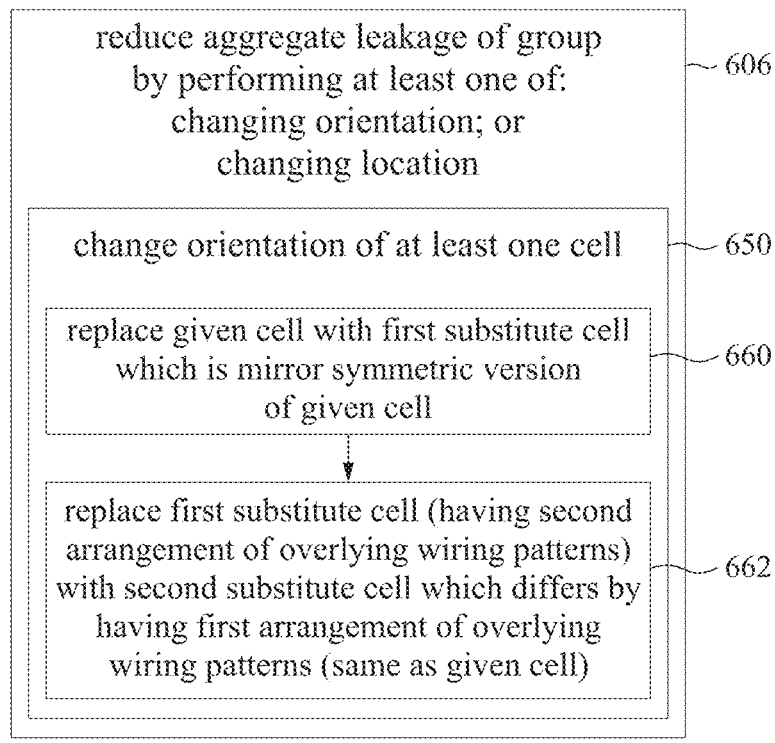

FIG. 6C is a flowchart of a method of generating a layout diagram, in accordance with some embodiments.

More particularly, the method of FIG. 6C shows block 606 of FIG. 6A in more detail, in accordance with one or more embodiments.

Examples of layout diagrams which can be generated according to the method of FIG. 6C include the layout diagrams disclosed herein, or the like. In some embodiments, the layout diagram and versions thereof are stored on a non-transitory computer-readable medium, e.g., stored as layout diagram(s) 708 in computer-readable medium 704 in FIG. 7 (discussed below). The method of FIG. 6C is implementable, for example, using EDA system 700 (FIG. 7, discussed below), in accordance with some embodiments. Examples of a semiconductor device which can be manufactured based on layout diagrams generated according to the method of FIG. 6C include semiconductor device 100 FIG. 1, and semiconductor devices based on 300D, 300H, 300L, 300Q, 300W, 400B or 400C, or the like.

In FIG. 6C, block 606 includes block 650. At block 650, an orientation of at least one cell is changed. Examples of having changed the orientation of at least one cell include layout 300D, 300H, 300L, 300W, 400B, or the like.

In some embodiments, block 650 includes blocks 660-662. At block 660, a given cell is replaced with a first substitute which is a mirror symmetric version of the given cell. Examples of such a replacement include cell 304(5)(I) of FIG. 3B being replaced with cell 304(5)(M) of FIG. 3D, cell 304(8)(I) of FIG. 3F being replaced with cell 304(8)(M) of FIG. 3H, cell 304(10)(I) of FIG. 3J being replaced with cell 304(10)(M) of FIG. 3L, cell 304(16)(U)(I) of FIG. 3T being replaced with cell 304(16)(U)(M) of FIG. 3W, cell 304(5)(I) of FIG. 4A being replaced with cell 304(5)(M) of FIG. 4B, or the like. From block 660, flow proceeds to block 662.

At block 662, the first substitute cell is replaced with a second substitute cell, where the first substitute cell has a second arrangement of overlying wiring patterns, and the second substitute cell has a first arrangement of overlying wiring patterns, and the given cell of block 660 (discussed above) also has the first arrangement of overlying patterns. An example of such a substitution is having substituted first substitute cell 304(5)(M) of FIG. 4B with second substitute cell 305(5)(M)' of FIG. 4C. From block 662, flow exits block 650.

Figure 6D:
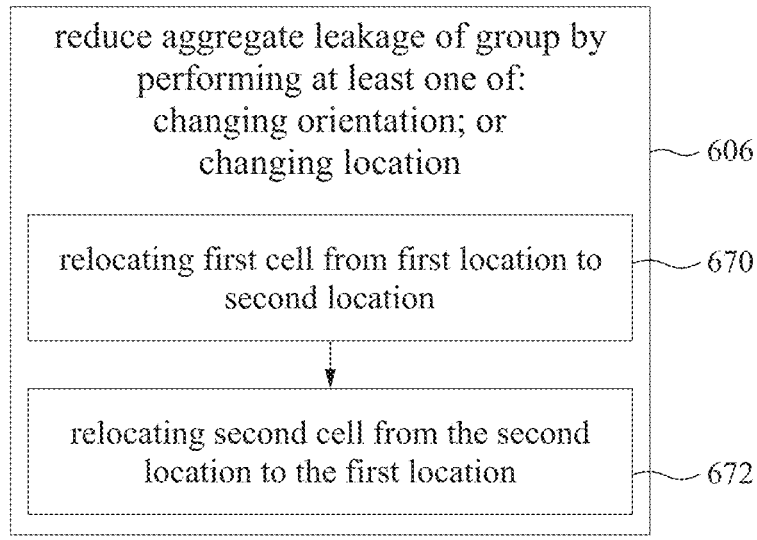

FIG. 6D is a flowchart of a method of generating a layout diagram, in accordance with some embodiments.

More particularly, the method of FIG. 6D shows block 606 of FIG. 6A in more detail, in accordance with one or more embodiments.

Examples of layout diagrams which can be generated according to the method of FIG. 6D include the layout diagrams disclosed herein, or the like. In some embodiments, the layout diagram and versions thereof are stored on a non-transitory computer-readable medium, e.g., stored as a layout diagram(s) 708 in computer-readable medium 704 in FIG. 7 (discussed below). The method of FIG. 6D is implementable, for example, using EDA system 700 (FIG. 7, discussed below), in accordance with some embodiments. Examples of a semiconductor device which can be manufactured based on layout diagrams generated according to the method of FIG. 6D include semiconductor device 100 FIG. 1, and a semiconductor device based on layout diagram 300Q, or the like.

In FIG. 6C, block 606 includes blocks 670-672. At block 670, a first cell is relocated from a first location to a second location. An example of such a first cell is cell 304(12)(S) of FIG. 3N, which is relocated from a first location in FIG. 3N to a second location in FIG. 3Q as cell 304(12)(S)'. From block 670, flow proceeds to block 672.

At block 672, a second cell is relocated from the second location to the first location. An example of such a second cell is cell 304(14)(U) of FIG. 3N, which is relocated from the location in FIG. 3N to the first location in FIG. 3Q as cell 304(13)(U)'.

Figure 7:
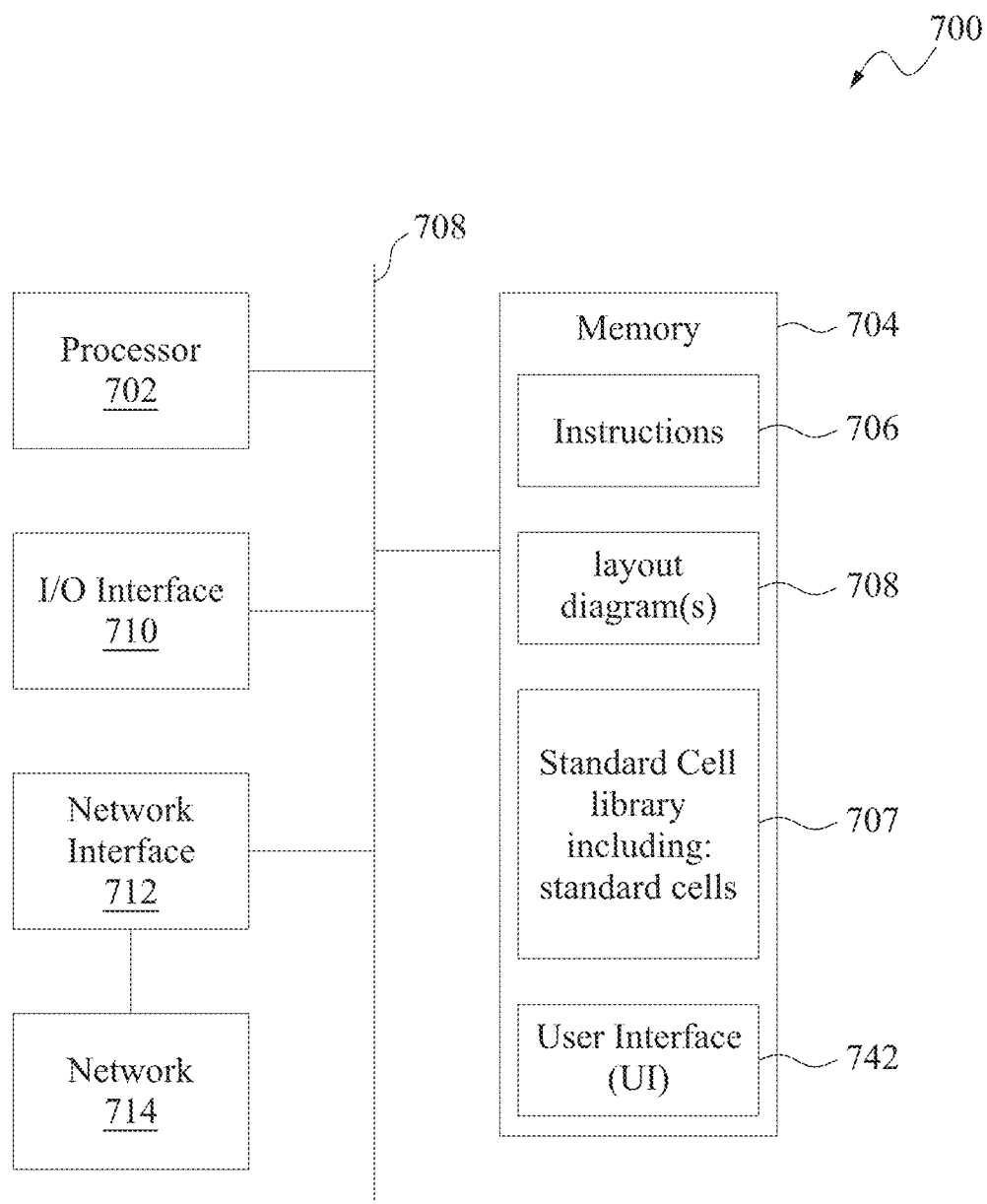
FIG. 7 is a block diagram of an electronic design automation (EDA) system, in accordance with some embodiments.

FIG. 7 is a block diagram of an electronic design automation (EDA) system 700, in accordance with some embodiments.

In some embodiments, EDA system 700 includes an automatic placement and routing (APR) system. Methods described herein of generating PG layout diagrams, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of a method according to an embodiment, e.g., the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code (instructions) 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein and one or more layout diagrams 708 such as are disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods are implemented as a software application running on EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
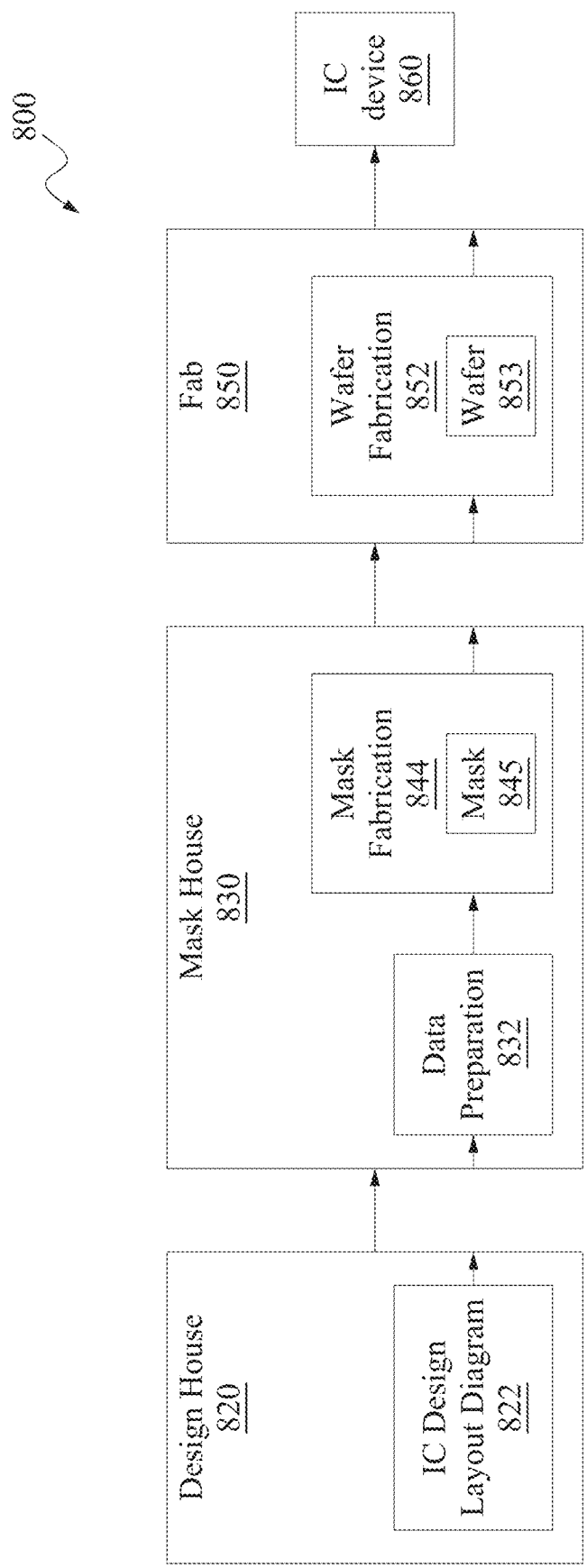
FIG. 8 is a block diagram of an integrated circuit (IC) manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a method (of manufacturing a semiconductor device) includes (for a layout diagram stored on a non-transitory computer-readable medium) generating a layout diagram including: populating a row which extends in a first direction with a group of cells, each cell representing a circuit, and first and second side boundaries of each cell being substantially parallel and extending in a second direction which is substantially perpendicular to the first direction; locating, relative to the first direction, cells so that neighboring ones of the cells are substantially abutting; and reducing an aggregate leakage tendency of the group by performing at least one of the following, (A) changing an orientation of at least one of the cells, or (B) changing locations correspondingly of at least two of the cells. In an embodiment, the reducing an aggregate leakage tendency of the group includes: determining a first figure of merit (FOM) representing the aggregate leakage tendency for the group; and reducing the first FOM by performing at least one of the following, (A) the changing an orientation of at least one of the cells, or (b) the changing a location of at least two of the cells. In an embodiment, each cell is organized into quadrants having corresponding quadrant-edges; designations of different quadrant-edge configurations (QECs) result in correspondingly different types of quadrant-edge pairs (QEPs) in a semiconductor device based on the layout diagram; and the determining a FOM for the group includes, for each type of QEP, determining a second FOM representing an aggregate leakage tendency for all instances of the corresponding type of QEP, and summing the second FOMs for each type of QEP. In an embodiment, at least one of the following is true: a circumstance (A) in which each of the cells has an NMOS-configured sub-row and a PMOS-configured sub-row, and, for abutting cells in which corresponding NMOS-configured sub-rows are substantially continuous and represent an N-type continuous active (CNA) region in the semiconductor device based on the layout diagram or in which PMOS-configured sub-rows are substantially continuous and represent a P-type CNA region in the semiconductor device, and for which each QEP represents a transistor in the corresponding semiconductor device, at least one condition of each QEC is whether a portion of the corresponding sub-row at the corresponding quadrant-edge of the corresponding cell represents a drain region or a source region of the corresponding transistor; or a circumstance (B) in which different ones of the cells have correspondingly different threshold voltage designations (TVDs), each TVD represents a corresponding threshold voltage configuration of transistors in a corresponding cell region of the semiconductor device based on the layout diagram, and, for abutting cells, at least two conditions of each QEC are a TVD of a first member of the QEP and a TVD of a second member of the QEP. In an embodiment, the changing an orientation of at least one of the cells includes: replacing, relative to a mirror plane which is substantially orthogonal to the first and second directions, a given one of the cells with a first substitute cell which is a mirror symmetric version of the given cell. In an embodiment, overlying wiring patterns of the given one of the cells have a first arrangement; overlying wiring patterns of the first substitute cell have a second arrangement; and the changing an orientation of at least one of the cells further includes replacing the first substitute cell with a second substitute cell, and a difference between the second substitute cell and the first substitute cell is that overlying wiring patterns of the second substitute cell have the first arrangement. In an embodiment, a first one of the cells is disposed in a first location; a second one of the cells is disposed in a second location; and he changing a location of at least two of the cells includes relocating the first cell to the second location, and relocating the second cell to the first location. In an embodiment, the method further includes, based on the layout diagram, at least one of: (A) making one or more photolithographic exposures; (B) fabricating one or more semiconductor masks; or (C) fabricating at least one component in a layer of a semiconductor integrated circuit.

In an embodiment, a system for manufacturing a semiconductor device, the system comprising at least one processor, and at least one memory including computer program code for one or more programs, and wherein the at least one memory, the computer program code and the at least one processor are configured to cause the system to execute, for a layout diagram stored on a non-transitory computer-readable medium, generating the layout diagram including: populating a row which extends in a first direction with a group of cells, each cell representing a circuit, and first and second side boundaries of each cell being substantially parallel and extending in a second direction which is substantially perpendicular to the first direction; locating, relative to the first direction, cells so that neighboring ones of the cells are substantially abutting; and reducing an aggregate leakage tendency of the group including: determining a first figure of merit (FOM) representing an aggregate leakage tendency for the group; and reducing the first FOM by performing at least one of (A) changing an orientation of at least one of the cells, or (B) changing locations correspondingly of at least two of the cells. In an embodiment, each cell is organized into quadrants having corresponding quadrant-edges; designations of different quadrant-edge configurations (QECs) result in correspondingly different types of quadrant-edge pairs (QEPs) in a semiconductor device based on the layout diagram; and the determining a FOM for the group includes, for each type of QEP, determining a second FOM representing an aggregate leakage tendency for all instances of the corresponding type of QEP; and summing the second FOMs for each type of QEP. In an embodiment, the determining a second FOM includes: assigning predetermined leakage value to each type of QEP, and multiplying a total number of instances of the type of QEP by the corresponding predetermined leakage value for the type of QEP to form a second FOM. In an embodiment, at least one of the following is true, namely a circumstance (A) in which each of the cells has an NMOS-configured sub-row and a PMOS-configured sub-row, and for abutting cells in which corresponding NMOS-configured sub-rows are substantially continuous and represent an N-type continuous active (CNA) region in the semiconductor device based on the layout diagram or in which PMOS-configured sub-rows are substantially continuous and represent a P-type CNA region in the semiconductor device, and for which each QEP represents a transistor in the corresponding semiconductor device, at least one condition of each QEC is whether a portion of the corresponding sub-row at the corresponding quadrant-edge of the corresponding cell represents a drain region or a source region of the corresponding transistor, or a circumstance (B) in which different ones of the cells have correspondingly different threshold voltage designations (TVDs), each TVD represents a corresponding threshold voltage configuration of transistors in a corresponding cell region of the semiconductor device based on the layout diagram, and for abutting cells, at least two conditions of each QEC are a TVD of a first member of the QEP and a TVD of a second member of the QEP. In an embodiment, the changing an orientation of at least one of the cells includes replacing, relative to a mirror plane which is substantially orthogonal to the first and second directions, a given one of the cells with a first substitute cell which is a mirror symmetric version of the given cell. In an embodiment, overlying wiring patterns of the given one of the cells have a first arrangement; overlying wiring patterns of the first substitute cell have a second arrangement; the changing an orientation of at least one of the cells further includes replacing the first substitute cell with a second substitute cell; and a difference between the second substitute cell and the first substitute cell is that overlying wiring patterns of the second substitute cell have the first arrangement. In an embodiment, a first one of the cells is disposed in a first location; a second one of the cells is disposed in a second location; and the changing a location of at least two of the cells includes relocating the first cell to the second location, and relocating the second cell to the first location. In an embodiment, the system further includes at least one of: a masking facility configured to fabricate one or more semiconductor masks based on the layout diagram; or a fabricating facility configured to fabricate at least one component in a layer of a semiconductor integrated circuit based on the layout diagram.

In an embodiment, a method (of manufacturing a semiconductor device) includes, for a layout diagram stored on a non-transitory computer-readable medium, generating the layout diagram including: populating a row which extends in a first direction with a group of cells, each cell representing a circuit, and first and second side boundaries of each cell being substantially parallel and extending in a second direction which is substantially perpendicular to the first direction; locating, relative to the first direction, cells so that neighboring ones of the cells are substantially abutting; and reducing an aggregate leakage tendency of the group by performing at least one of the following, (A) replacing, relative to a mirror plane which is substantially orthogonal to the first and second directions, a given one of the cells with a first substitute cell which is a mirror symmetric version of the given cell, or (B) changing locations correspondingly of at least two of the cells. In an embodiment, overlying wiring patterns of the given one of the cells have a first arrangement; overlying wiring patterns of the first substitute cell have a second arrangement; and the changing an orientation of at least one of the cells further includes replacing the first substitute cell with a second substitute cell for which overlying wiring patterns have the first arrangement. In an embodiment, a first one of the cells is disposed in a first location; a second one of the cells is disposed in a second location; and the changing a location of at least two of the cells includes relocating the first cell to the second location, and relocating the second cell to the first location. In an embodiment, the method further comprises, based on the layout diagram, at least one of: (A) making one or more photolithographic exposure; (B) fabricating one or more semiconductor masks; or (C) fabricating at least one component in a layer of a semiconductor integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, the method comprising:
for a layout diagram stored on a non-transitory computer-readable medium, generating the layout diagram including:
populating a row which extends in a first direction with a group of cells;
each cell representing a circuit; and
first and second side boundaries of each cell being substantially parallel and extending in a second direction which is substantially perpendicular to the first direction;
locating, relative to the first direction, cells so that neighboring ones of the cells are substantially abutting; and
reducing an aggregate leakage tendency of the group by performing at least one of the following:
changing an orientation of at least one of the cells; or
changing locations correspondingly of at least two of the cells; and
based on the layout diagram, at least one of:
(A) making one or more photolithographic exposure;
(B) fabricating one or more semiconductor masks; or
(C) fabricating at least one component in a layer of a semiconductor integrated circuit.

2. The method of claim 1, wherein the reducing an aggregate leakage tendency of the group includes:
determining a first figure of merit (FOM) representing the aggregate leakage tendency for the group; and
reducing the first FOM by performing at least one of the following:
the changing an orientation of at least one of the cells; or
the changing a location of at least two of the cells.

3. The method of claim 1, wherein:
each cell is organized into quadrants having corresponding quadrant-edges;
designations of different quadrant-edge configurations (QECs) result in correspondingly different types of quadrant-edge pairs (QEPs) in a semiconductor device based on the layout diagram; and
the determining a FOM for the group includes:
for each type of QEP, determining a second FOM representing an aggregate leakage tendency for all instances of the corresponding type of QEP; and
summing the second FOMs for each type of QEP.

4. The method of claim 3, wherein at least one of the following is true:
a circumstance (A) in which:
each of the cells has an NMOS-configured sub-row and a PMOS-configured sub-row; and
for abutting cells in which corresponding NMOS-configured sub-rows are substantially continuous and represent an N-type continuous active (CNA) region in the semiconductor device based on the layout diagram or in which PMOS-configured sub-rows are substantially continuous and represent a P-type CNA region in the semiconductor device, and for which each QEP represents a transistor in the corresponding semiconductor device, at least one condition of each QEC is whether a portion of the corresponding sub-row at the corresponding quadrant-edge of the corresponding cell represents a drain region or a source region of the corresponding transistor; or
a circumstance (B) in which:
different ones of the cells have correspondingly different threshold voltage designations (TVDs);
each TVD represents a corresponding threshold voltage configuration of transistors in a corresponding cell region of the semiconductor device based on the layout diagram; and
for abutting cells, at least two conditions of each QEC are a TVD of a first member of the QEP and a TVD of a second member of the QEP.

5. The method of claim 1, wherein the changing an orientation of at least one of the cells includes:
replacing, relative to a mirror plane which is substantially orthogonal to the first and second directions, a given one of the cells with a first substitute cell which is a mirror symmetric version of the given cell.

6. The method of claim 5, wherein:
overlying wiring patterns of the given one of the cells have a first arrangement;
overlying wiring patterns of the first substitute cell have a second arrangement;
the changing an orientation of at least one of the cells further includes:
replacing the first substitute cell with a second substitute cell; and
a difference between the second substitute cell and the first substitute cell is that overlying wiring patterns of the second substitute cell have the first arrangement.

7. The method of claim 1, wherein:
a first one of the cells is disposed in a first location;
a second one of the cells is disposed in a second location; and
the changing a location of at least two of the cells includes:
relocating the first cell to the second location; and
relocating the second cell to the first location.

8. The method of claim 1, wherein changing locations correspondingly of at least two of the cells comprises swapping positions of at least two of the cells.

9. A system for manufacturing a semiconductor device, the system comprising:
at least one processor; and
at least one memory including computer program code for one or more programs;
wherein the at least one memory, the computer program code and the at least one processor are configured to cause the system to execute:
for a layout diagram stored on a non-transitory computer-readable medium, generating the layout diagram including:
populating a row which extends in a first direction with a group of cells;
each cell representing a circuit; and
first and second side boundaries of each cell being substantially parallel and extending in a second direction which is substantially perpendicular to the first direction;

locating, relative to the first direction, cells so that neighboring ones of the cells are substantially abutting; and reducing an aggregate leakage tendency of the group by performing at least one of the following:

determining a first figure of merit (FOM) representing an aggregate leakage tendency for the group; and reducing the first FOM by performing at least one of the following:

changing an orientation of at least one of the cells; or changing locations correspondingly of at least two of the cells; and further comprising at least one of:

a masking facility configured to fabricate one or more semiconductor masks based on the layout diagram; or a fabricating facility configured to fabricate at least one component in a layer of a semiconductor integrated circuit based on the layout diagram.

10. The system of claim 9, wherein:

each cell is organized into quadrants having corresponding quadrant-edges;

designations of different quadrant-edge configurations (QECs) result in correspondingly different types of quadrant-edge pairs (QEPs) in a semiconductor device based on the layout diagram; and the determining a FOM for the group includes:

for each type of QEP, determining a second FOM representing an aggregate leakage tendency for all instances of the corresponding type of QEP; and summing the second FOMs for each type of QEP.

11. The system of claim 10, wherein the determining a second FOM includes:

assigning a predetermined leakage value to each type of QEP; and for each type of QEP, multiplying a total number of instances of the type of QEP by the corresponding predetermined leakage value for the type of QEP.

12. The system of claim 10, wherein at least one of the following is true:

a circumstance (A) in which:

each of the cells has an NMOS-configured sub-row and a PMOS-configured sub-row; and for abutting cells in which corresponding NMOS-configured sub-rows are substantially continuous and represent an N-type continuous active (CNA) region in the semiconductor device based on the layout diagram or in which PMOS-configured sub-rows are substantially continuous and represent a P-type CNA region in the semiconductor device, and for which each QEP represents a transistor in the corresponding semiconductor device, at least one condition of each QEC is whether a portion of the corresponding sub-row at the corresponding quadrant-edge of the corresponding cell represents a drain region or a source region of the corresponding transistor; or a circumstance (B) in which:

different ones of the cells have correspondingly different threshold voltage designations (TVDs);

each TVD represents a corresponding threshold voltage configuration of transistors in a corresponding cell region of the semiconductor device based on the layout diagram; and for abutting cells, at least two conditions of each QEC are a TVD of a first member of the QEP and a TVD of a second member of the QEP.

13. The system of claim 9, wherein the changing an orientation of at least one of the cells includes:

replacing, relative to a mirror plane which is substantially orthogonal to the first and second directions, a given one of the cells with a first substitute cell which is a mirror symmetric version of the given cell.

14. The system of claim 13, wherein:

overlying wiring patterns of the given one of the cells have a first arrangement;

overlying wiring patterns of the first substitute cell have a second arrangement;

the changing an orientation of at least one of the cells further includes:

replacing the first substitute cell with a second substitute cell; and a difference between the second substitute cell and the first substitute cell is that overlying wiring patterns of the second substitute cell have the first arrangement.

15. The system of claim 9, wherein:

a first one of the cells is disposed in a first location;

a second one of the cells is disposed in a second location; and the changing a location of at least two of the cells includes:

relocating the first cell to the second location; and relocating the second cell to the first location.

16. The system of claim 9, wherein changing locations correspondingly of at least two of the cells comprises swapping positions of at least two of the cells.

17. A method of manufacturing a semiconductor device, the method comprising:

for a layout diagram stored on a non-transitory computer-readable medium, generating the layout diagram including:

populating a row which extends in a first direction with a group of cells;

each cell representing a circuit; and first and second side boundaries of each cell being substantially parallel and extending in a second direction which is substantially perpendicular to the first direction;

locating, relative to the first direction, cells so that neighboring ones of the cells are substantially abutting; and reducing an aggregate leakage tendency of the group by performing at least one of the following:

replacing, relative to a mirror plane which is substantially orthogonal to the first and second directions, a given one of the cells with a first substitute cell which is a mirror symmetric version of the given cell; or changing locations correspondingly of at least two of the cells; and based on the layout diagram, at least one of:

(A) making one or more photolithographic exposure;

(B) fabricating one or more semiconductor masks; or (C) fabricating at least one component in a layer of a semiconductor integrated circuit.

18. The method of claim 17, wherein:

overlying wiring patterns of the given one of the cells have a first arrangement;

overlying wiring patterns of the first substitute cell have a second arrangement; and the changing an orientation of at least one of the cells further includes:
   replacing the first substitute cell with a second substitute cell for which overlying wiring patterns have the first arrangement.

19. The method of claim 17, wherein:
a first one of the cells is disposed in a first location;
a second one of the cells is disposed in a second location; and
the changing a location of at least two of the cells includes:
   relocating the first cell to the second location; and
   relocating the second cell to the first location.

20. The method of claim 17, wherein changing locations correspondingly of at least two of the cells comprises swapping positions of at least two of the cells.

* * * * *